US008543534B2

(12) United States Patent
Alves et al.

(10) Patent No.: US 8,543,534 B2
(45) Date of Patent: Sep. 24, 2013

(54) CONCURRENCY IN EVENT PROCESSING NETWORKS FOR EVENT SERVER

(75) Inventors: Alexandre de Castro Alves, San Jose, CA (US); Dana Bergen, Oakland, CA (US); Andrew Piper, Amersham (GB)

(73) Assignee: Oracle International Corporation, Redwood Shores, CA (US)

( * ) Notice: Subject to any disclaimer, the term of this patent is extended or adjusted under 35 U.S.C. 154(b) by 895 days.

(21) Appl. No.: 12/133,167

(22) Filed: Jun. 4, 2008

(65) Prior Publication Data

US 2009/0070785 A1 Mar. 12, 2009

Related U.S. Application Data

(60) Provisional application No. 60/971,460, filed on Sep. 11, 2007.

(51) Int. Cl.
*G06F 7/00* (2006.01)

(52) U.S. Cl.
USPC ............ 707/601; 707/600; 707/607; 707/613

(58) Field of Classification Search
USPC .......................................................... 707/601
See application file for complete search history.

(56) References Cited

U.S. PATENT DOCUMENTS

| 5,991,751 | A | 11/1999 | Rivette et al. |
| 6,138,121 | A | 10/2000 | Costa |
| 6,141,647 | A | 10/2000 | Meijer |
| 6,408,324 | B1 | 6/2002 | Wallace et al. |
| 6,502,133 | B1 | 12/2002 | Baulier et al. |
| 6,785,677 | B1 | 8/2004 | Fritchman |
| 6,795,854 | B1 | 9/2004 | Parker et al. |
| 7,162,540 | B2 * | 1/2007 | Jasen et al. ..................... 709/242 |
| 7,356,764 | B2 | 4/2008 | Radja |
| 7,457,728 | B2 | 11/2008 | Chen |
| 7,627,544 | B2 | 12/2009 | Chkodrov |
| 7,661,032 | B2 | 2/2010 | Eberbach |
| 7,801,851 | B2 * | 9/2010 | Holenstein et al. ........... 707/615 |
| 2005/0060372 | A1 | 3/2005 | DeBettencourt |
| 2005/0108001 | A1 | 5/2005 | Aarskog |
| 2005/0108718 | A1 | 5/2005 | Kumar et al. |
| 2006/0184410 | A1 * | 8/2006 | Ramamurthy et al. ........... 705/8 |
| 2006/0230029 | A1 | 10/2006 | Yan |
| 2006/0230071 | A1 | 10/2006 | Kass |
| 2006/0282695 | A1 * | 12/2006 | Mital et al. ..................... 713/502 |
| 2007/0043703 | A1 | 2/2007 | Bhattacharya |
| 2007/0250766 | A1 | 10/2007 | Medi |
| 2007/0271280 | A1 | 11/2007 | Chandasekaran |

(Continued)

FOREIGN PATENT DOCUMENTS

WO   WO 00/29942   5/2000

OTHER PUBLICATIONS

International Search Report for PCT/US2008/073046, dated Feb. 25, 2009, 13 pages.

(Continued)

*Primary Examiner* — Hosain Alam
*Assistant Examiner* — Bruce Witzenburg

(57) ABSTRACT

An event server running an event driven application implementing an event processing network. The event processing network can include at least one processor to implement a rule on at least one input stream. The event processing network can define concurrent operation of at least two components of the event processing networks.

23 Claims, 18 Drawing Sheets

(56) References Cited

U.S. PATENT DOCUMENTS

2008/0120283 A1    5/2008  Liu
2008/0189277 A1    8/2008  Meijer
2008/0307435 A1   12/2008  Rehman

OTHER PUBLICATIONS

PCT International Preliminary Report on Patentability dated Mar. 25, 2010 for Application No. PCT/US2008/073046, 7 pages.

Arasu, et al., "STREAM: The Stanford Data Stream Management System", Mar. 14, 2004, 21 pages.

Srivastava, et al., "Flexible Time Management in Data Stream Systems". PODS, Jun. 14-16, 2004, ACM, Paris, France, 11 pages.

Dani, et al., "Conceptual Modelling of Computations on Data Streams", Second Asia-Pacific Conference on Conceptual Modelling (APCCM2005), University of Newcastle, Newcastle, AU, vol. 43, 2005, 6 pages.

Hinze, "Efficient Filtering of Composite Events", Proceedings of he 20th British National Database Conference, 2003, 19 pages, Coventry, UK.

Wu, et al., "High-Performance Complex Event Processing Over Streams", Proceedings of the 2006 ACM SIGMOD International Conference on Management of Data, 2006, 12 pages.

Stonebraker, et al., "The 8 Requirements of Real-time Stream Processing", ACM SIGMOD Record, Dec. 2005, vol. 34, Issue 4, 6 pages.

International Search Report for PCT/US2008/63986, dated Sep. 2, 2008, 11 pages.

The Stream Group, "STREAM: The Stanford Stream Data Manager", Bulletin of IEEE Computer Society Technical Committee on Data Engineering, Mar. 2003, Stanford University, Stanford CA, 8 pages.

Unknown, "Stream, Schema, Adapter, and Parameter CCL Language Extensions", Coral8 Engine Version 4.8, 7 pages.

Coral8, Inc., "Coral8 Programmer's Guide Version 4.8", 2004-2007, 79 pages.

Lamonica, "A New Event in Programming?", Oct. 12, 2004, CNET News.com, 3 pages.

Santoro, et al., "SPARC-V9 Architecture Specification with Rapide", Technical Report: CSL-TR-95-677, Sep. 1995, Stanford University, Stanford, CA, 71 pages.

Thome & Gawlick, et al., Event Processing with an Oracle Database, Jun. 14-16, 2005, SIGMOD 2005, 5 pages.

* cited by examiner

CONCURRENCY IN EVENT PROCESSING NETWORKS FOR EVENT SERVER

CLAIM OF PRIORITY

This application claims priority to U.S. Provisional Application No. 60/971,460 entitled "EVENT PROCESSING NETWORK" by Alves et al., filed Sep. 11, 2007, which is hereby incorporated by reference.

BACKGROUND

Event processing is becoming more and more popular. In a complex event processor, streams of data are evaluated in real time. Because of the amount of data and the operation speeds required, the data is typically not stored into a database before it is processed.

DETAILED DESCRIPTION

Figure 1:
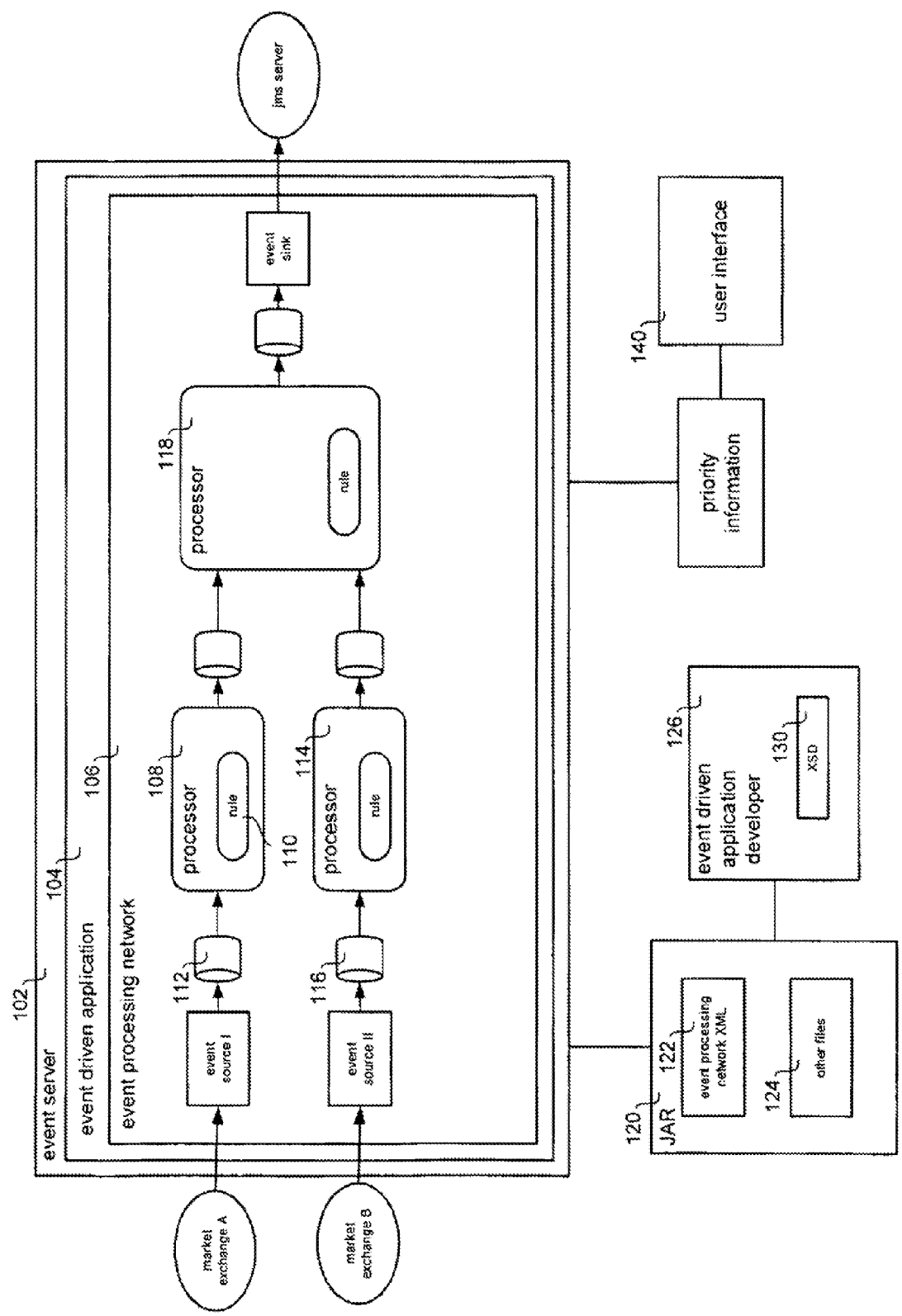
FIG. 1 illustrates an event server using an event processing network with concurrency and preferences of one embodiment of the present invention.

FIG. 1 shows an event server 102 running an event driven application 104 implementing an event processing network 106. The event processing network 106, including at least one processor 108 to implement a rule 110 on at least one input stream 112. The event processing network 106 can define the concurrent operation of at least two components of the event processing network.

In the example of FIG. 1, processor 108 and processor 114 can operate concurrently so that the events from input stream 112 and input stream 116 can be filtered and then provided to processor 118. Without concurrent operation, the processor 118 may not be insured of getting the filter events at the desired time.

The processors 108 can implement rules. The rules can be written in an Event Processing Language, such as the event processing language described in the provisional application "Event Processing Language", Alves, et al., filed May 29, 2007, U.S. patent application Ser. No. 60/940,655, incorporated herein by reference.

The streams can include queries to store events. The events can be sent from the queues into processors. Event sources and sinks can provide and consume events respectively.

FIGS. 2A-2E illustrates concurrency concepts.

Figure 2A:
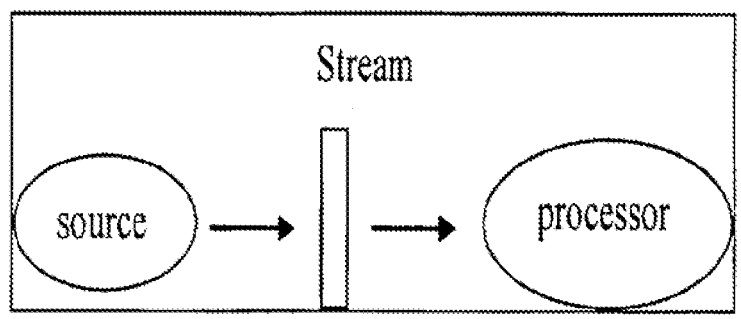
FIGS. 2A-2E illustrates the use of concurrency in an event processing network.

In the scenario of FIG. 2A, each event is processed sequentially from source to processor.

Figure 2B:
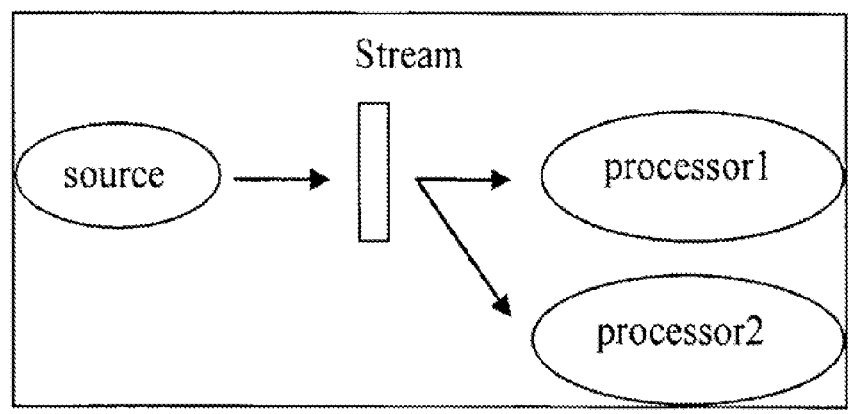

In the scenario of FIG. 2B, each event is first handled by the event source, and then processed concurrently by processors 1 and 2.

Figure 2C:
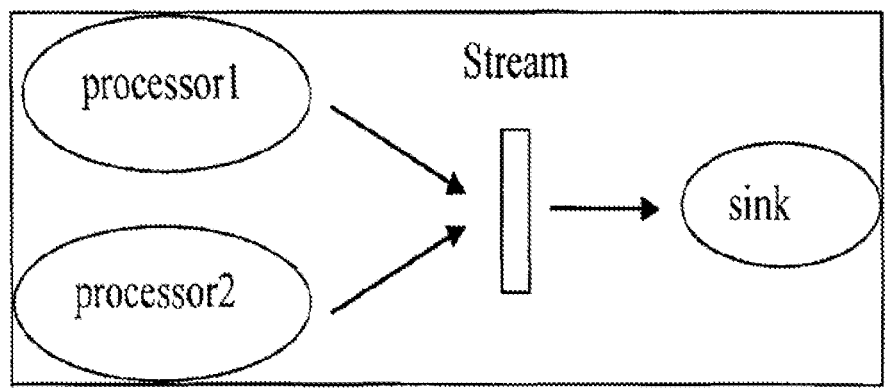

In the scenario of FIG. 2C, the event sink will only be enabled to start handling when both processors fire the (same) event to stream. In another words, the sink waits for the flow of control to join back into a single flow.

Figure 2D:
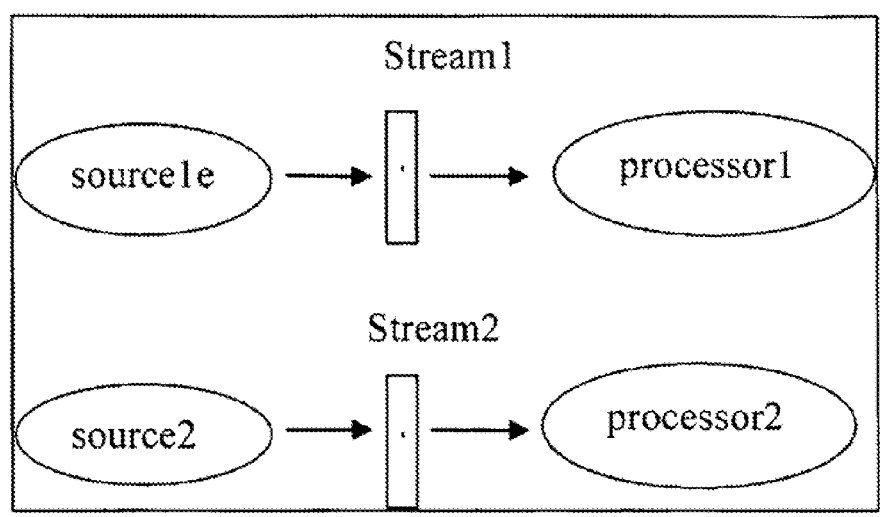

In the scenario of FIG. 2D, events are processed sequentially from source1 to processor1, and sequentially from source2 to processor2, but concurrently in relation to each other.

Figure 2E:
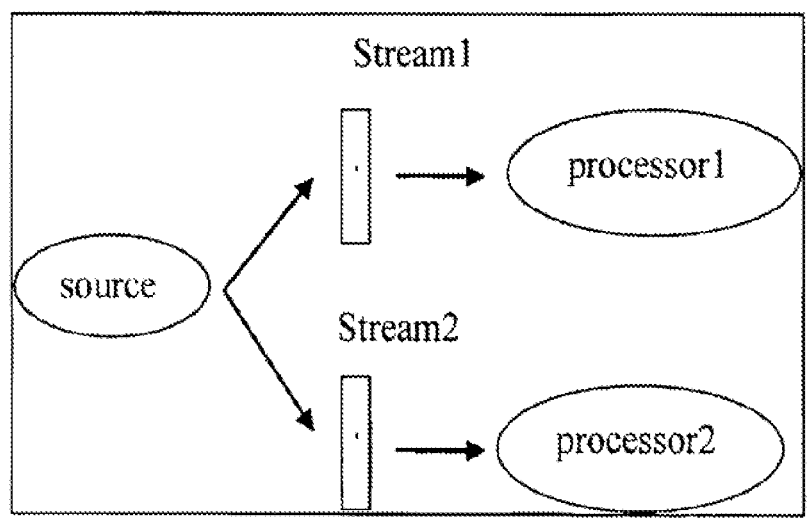

The scenario of FIG. 2E is similar to FIG. 2B, except that the events leaving the source are duplicated before entering the streams. In some cases this may not matter, however in some other cases, where a stream has guarding conditions, this will matter. Guarding conditions are explained later.

In the example of FIG. 2C, we can determine which two events will join back into the stream by coloring the events. From the Event Processing Network perspective, events of the same color are similar, and can be considered of the same token type, and therefore can be joined back.

By default, all events can be created with different colors. However, when an event is duplicated, as it is the case in examples of FIG. 2B and 2E, the new event can share the same color as of the original event. Hence, a stream can join back these into a single (complex) event as needed.

Coloring can be more generic than just using the ID of an event. Groupings can potentially include events that do not share an ID. For example, consider the case where a processor is aggregating events into a new complex event, and one wants to be able to synchronize to this new complex event, which does not share IDs with any other event. One possible choice of colors is to map a color to the event ID.

The color of an event can be defined using Event Processing Language expressions that are able to use literals and reference event properties.

The transitions (e.g. streams in our case) can have guarding conditions that must be fulfilled before the tokens (e.g. events) can proceed. Two such conditions can be a delay number, and a deadline number.

One possible guarding condition can be the stream's queue size: if the queue is past some maximum threshold, then the event can be rejected with the possible follow-up policies:
  Discard event in question
  Discard latest event in queue and re-try
  Block sender (and in effect throttle down the flow)
  A deadline property can be supported as well, where events can get rejected if they are passed some deadline.

Guarding conditions can protect the Event Processing Network against the scenarios of extremely high loads.

In the previous sections we were only considering one event at a time, but in reality there can be a set of events being processed by the Event Processing Network.

One solution is to provide an ordering guarding condition at the streams. When enabled this condition can guarantee ordering of the events, such as by using the following definition:
  All events can be created with a birthday (immutable) timestamp and as they enter the Event Processing Network;
  At a particular transition (that is, a stream), events can be processed so that at no time an event with a smaller (less recent) timestamp is processed after an event with a higher (more recent) timestamp.

Additional constraints can include constraints that events are always received with non-decreasing timestamps or constraints that define a wait period.

In cases where one does not care about ordering, the infrastructure (e.g. stream) can try to do a best effort to run these concurrently.

A ThreadPoolExecutor (TPE) associated with a stream can be used. In one embodiment, a TPE allows one to:

Ride the caller's thread;
Expand and shrink the thread pool based upon a threshold and a maximum property;
Use different task queues, such as blocking queues and array lists;
Define policies for rejecting tasks and for the rejected tasks;

A ThreadPoolExecutor can be wrapped in a WM interface to allow different components to share the same pool. This can allow the end-user to:

have a single TPE for the entire server;
a TPE per application
a TPE per stream (or set of streams)

In terms of configuration, we can allow people to configure most of the available parameters of the TPE, and at least monitor some of them at runtime, such as the task queue.

For Fault handling:

Exceptions raised within the Event Processing Network (e.g. adapters, streams, processors, POJOs) by default can be caught by the infrastructure, logged, cause increment of statistical number of errors, but otherwise discarded.
An exception to be propagated can be RejectEventException, which can be explicitly raised by the client;
RejectEventExceptions need not cause the termination of the other sibling nodes in the Event Processing Network.

Looking again at FIG. 1, the application can be bundled into a JAR 120 or other archives The JAR can include XML 122 that defines the Event Processing Network and other files 124 for the application.

The application can be developed using application developer 126. The application developer can use XSD 130 to define the XML schema. The schema of the XML 122 can be an extension of the SPRING framework.

The event processing network 106 can use priority information. The priority of parts of the event processing network 106 can be settable by a user.

One way to do this is by using limits on queries of input streams of the processors. For example, if certain portions are less critical, they can be set up with a smaller queue size. This can mean that the system can discard events from this section preferably.

For example, in the example of FIG. 1, the queue at input stream 116 can be set to queue a maximum of 100 events while the queue at input stream 112 can be set much higher at 1000 events. This can provide a priority for the system.

The priority can be input from a user interface 140 or made part of the Event Processing Network XML.

Figure 3:
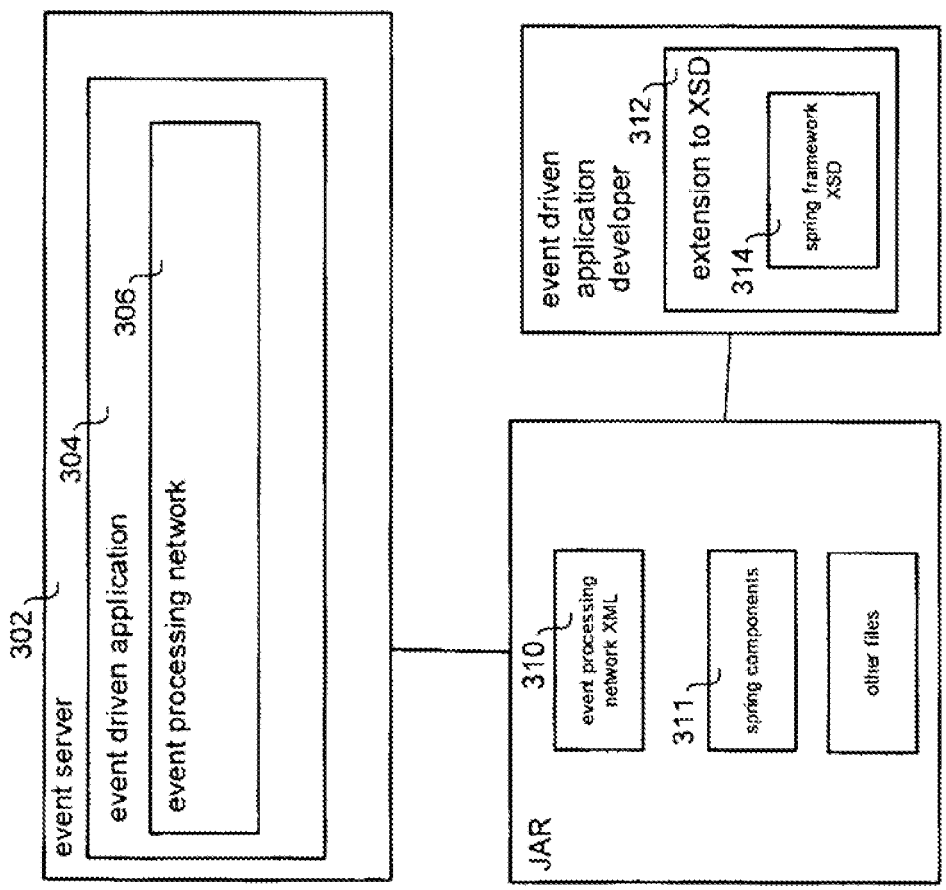
FIG. 3 illustrates an event server using an event processing network defined by an XML file of one embodiment of the present invention.

FIG. 3 shows an example of an XML-based Event Processing System.

Event server 302 can run an event driven application 304 implementing an Event Processing Network. The Event Processing Network can include processors, streams, adapters and the like.

The Event Processing Network can be specified by XML 310. The XML 310 can be an extension of SPRING framework XML.

For example, the SPRING framework XSD 314 can be extended with additional schema information to create the extended XSD 312.

Since the XML 310 is an extension of the SPRING framework XML, SPRING framework components 311, such as SPRING beans, can be easily incorporated into the Event Processing Network 306.

The extensions of the XML can define processors, rules, streams, adapters, sinks and other Event Processing Network components.

The example below shows one example of new abstractions, models, and design patterns for Event Driven Applications.

Abstractions for the Event Driven Applications programming model can include:

Event Sources and Event Sinks: application code that respectively generate events and receives events
Streams: channels through which events flow
Processors: agents capable of processing events; the processing function or capability can vary per agent
Event Types: metadata defining the properties of events Developers can author event-driven applications by creating instances of these abstractions.

Figure 4:
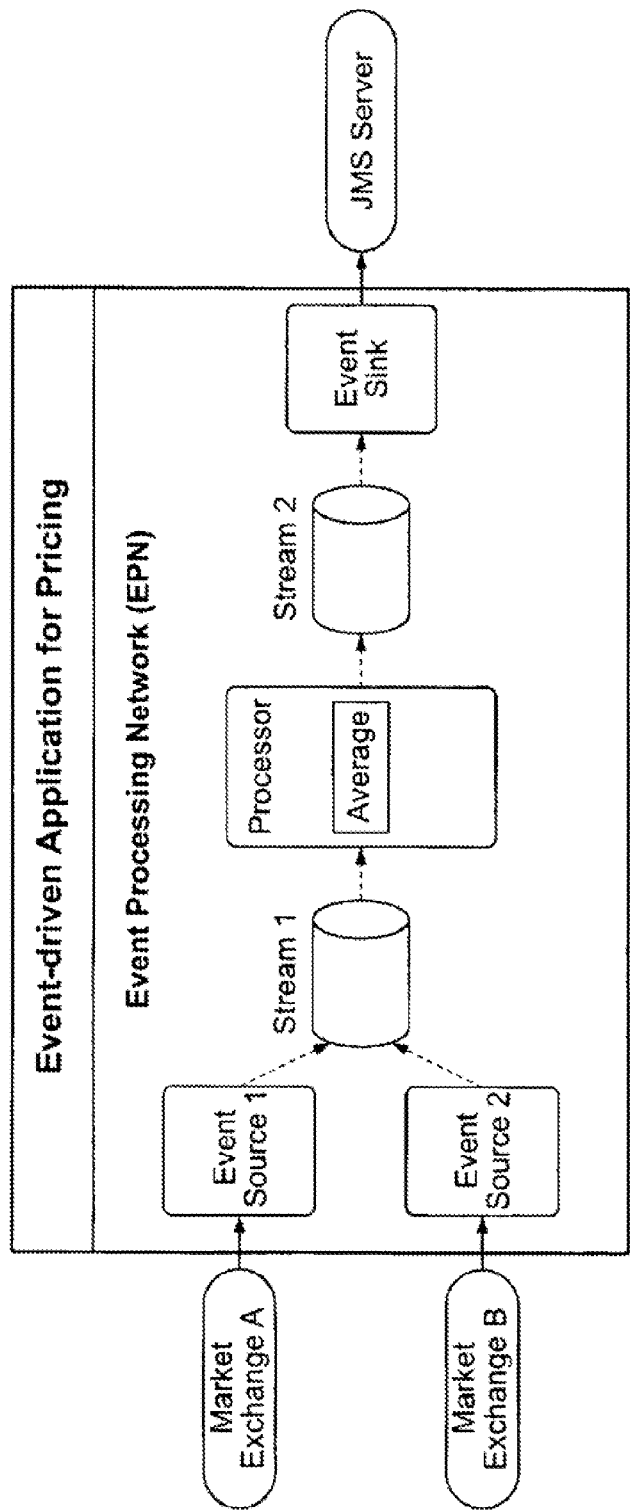
FIG. 4 illustrates an exemplary event driven financial market pricing application of one embodiment.

FIG. 4 shows a simple financial market pricing application example. The goal of this pricing application is to determine what would be the best price to quote its clients that wish to trade stocks. This event-driven application can create two event sources, each receiving stock tick events from two different exchange markets. For sake of simplicity, the stock tick event contains only two event properties, its stock symbol and the latest traded price of the stock. The application can further define a processor that is configured to calculate and output the price of a stock symbol as being the average price received from the two event sources. Finally, there is a single event sink that publishes the calculated average stock price to a well-known JMS destination. The event sources can be connected to the processor by having the event sources send events to a common stream that the processor listens to. Likewise, the processor can be connected to the event sink by sending its event, the average stock price, to a shared stream that the event sink listens to.

The events can flow from the two event sources, to the first stream, then to the processor, then to the second stream, and finally to the event sink. This flow of events across the Event Driven Application (EDA) components can form an EPN.

An EPN can be another abstraction of the EDA programming model. In one example, it can be:

An uprooted cyclic directed graph of event sources, event sinks, streams, and processors; all collaborating towards fulfilling the function of a event-driven application. An EPN can model horizontal composition and vertical layering of event processing.

An event-driven application can specify an EPN, and the EPN can assemble the EDA components (e.g. event sources, event sinks, processors, streams) together.

Streams can de-couple event sources from event sinks; this can be similar to what a JMS destination does to JMS publishers and subscribers
Streams can manage the flow of events; this can be done by providing queuing capability, with different rejection policies, and by providing different dispatching mechanisms, such as synchronous and asynchronous dispatching The specification of an EPN can be declarative. The event driven application can be assembled by using some declarative mechanism, such as XML. Furthermore, the business logic can be kept de-coupled from the technology. Finally, functionality can be pay-as-you-go. This latter means that if you don't need a service, for example persistence or security, then you do not need to configure, reference (e.g. implement some technology interface), or otherwise be impacted by this service that you don't intend on using to begin with.

The Event Server, such as the WebLogic Event Server (EvS) can have native support for this EDA programming model.

In EvS, a user application can be an EPN, and have support for creating event sources, event sinks, streams, processors, and event types.

Event sources and event sinks may be bound to different plug-able protocols, such as JMS. An event source or event sink that is bound to some specific protocol and is responsible for converting or passing along external events to and from the EPN can be called Adapters. Processors can support BEA's Event Processing Language. JAVA Beans can be registered in the EPN as Event Types. Streams can support dynamic configuration of queuing and concurrency parameters.

The EPN itself can be specified in a XML configuration file, called the EPN assembly file.

The EPN assembly file can be a custom extension of a SPRING framework context XML configuration file. What this means is that the event server can leverage SPRING's Inversion of Control (IoC) container in its entirely, thus allowing one to seamlessly use SPRING beans (and any other SPRING feature, such as AOP) in the assembly of a EPN. The event server can define its own custom tags for the EDA components; hence a developer does not need to understand how the SPRING framework works to create event-driven applications. The EDA programming model extensions to SPRING can be called Hot-SPRING.

Back to our pricing application example, if you consider that the event sources and event sinks are re-using existing adapter implementations respectively that understand the market exchange protocol and JMS, then the whole EDA application can be authored without the developer having to write a single line of JAVA code. In this example, the developer only has to specify the EPN assembly file and configure the processor and adapters that it is using, all done through XML files or through a user interface, such as a command-line interface (CLI) Administration tool.

The developer can always create JAVA POJOs (Plain-Old-JAVA-Objects) functioning in the roles of event sources or event sinks and assembled them together in the EPN.

The event server deployment unit can be a SPRING-OSGI bundle. To begin with, a bundle can be a regular JAR file. The SPRING aspect of it means that this JAR file can contain a SPRING context configuration; this can be an EPN assembly file, within the directory META-INF/SPRING. The second aspect of this is OSGi. OSGi is a service-oriented, component-based backplane. An OSGi bundle can contain special OSGi entries in its MANIFES.MF file within the JAR file that specify, among other things, service dependencies and service advertisement. Having the Event Driven Application is an OSGi bundle can help promote maintainability, re-use, and interoperability.

Because Event Server applications are low latency high-performance driven applications, they can run on a light-weight container and can be developed using a POJO-based programming model. In POJO (Plain Old JAVA Object) programming, business logic is implemented in the form of POJOs, and then injected with the services they need. This is can be called dependency injection. The injected services can range from those provided by WebLogic Event Services, such as configuration management, to those provided by another BEA product such as BEA Kodo, to those provided by a third party.

WebLogic Event Server can define a set of core services or components used together to assemble event-driven applications; these services are adapters, streams, and processors. In addition to these, WebLogic Event Server can include other infrastructure services, such as configuration, monitoring, logging, and so on.

Services can be deployed on the underlying BEA's microServices Architecture (mSA) technology, which is based upon the OSGi Service Platform defined by the OSGi Alliance.

WebLogic Event Server applications can be made up of the following components:

Adapters—Components that can provide an interface to incoming data feeds and convert the data into event types that the WebLogic Event Server application understands.

Streams—Components that can function as virtual pipes or channels, connecting event sources to event sinks.

Complex Event Processors—Components that can execute user-defined event processing rules against streams.

The user-defined rules can be written using the Event Processing Language (EPL).

Business Logic POJO—User-coded POJO can receive events from the complex event processor, after the EPL rules have fired.

Each component in the event processing network (adapter, processor, or stream) can have an associated configuration file, although only processors are required to have a configuration file. Component configuration files in WebLogic Event Server can be XML documents whose structure is defined using standard XML Schema. In one embodiment, the following two schema documents can define the default structure of application configuration files:

wlevs_base_config.xsd: Can define common elements that are shared between application configuration files and the server configuration file.

wlevs_application_config.xsd: Can define elements that are specific to application configuration files.

The structure of application configuration files can be as follows. There can be a top-level root element named <config> that contains a sequence of sub-elements. Each individual sub element can contain the configuration data for a WebLogic Event Server component (processor, stream, or adapter). For example:

```
<?xml version="1.0" encoding="UTF-8"?>
<helloworld:config
  xmlns:helloworld="http://www.bea.com/ns/wlevs/example/helloworld">
  <processor>
    <name>helloworldProcessor</name>
    <rules>
      <rule id="helloworldRule"><![CDATA[ select * from HelloWorldEvent retain 1 event ]]></rule>
    </rules>
  </processor>
  <adapter>
    <name>helloworldAdapter</name>
    <message>HelloWorld - the current time is:</message>
  </adapter>
  <stream monitoring="true">
    <name>helloworldOutstream</name>
    <max-size>10000</max-size>
    <max-threads>2</max-threads>
  </stream>
</helloworld:config>
```

WebLogic Event Server applications can be made of services that are assembled together to form an EPN.

The server can use the SPRING framework as its assembly mechanism. WebLogic Event Server can extend the SPRING framework to further simplify the process of assembling applications. This approach can allow Server applications to be easily integrated with existing SPRING-beans, and other light-weight programming frameworks that are based upon a dependency injection mechanism.

A XML configuration file can declaratively specify the dependencies and assembly of an application. A WebLogic Event Server application and EPN assembly files can be assembled before deploying it to the server; this EPN assembly file can be an extension of the SPRING framework XML configuration file.

After an application is assembled, it can be packaged so that it can be deployed into WebLogic Event Server. This is a simple process. The deployment unit of an application can be a plain JAR file, which can include the following artifacts:

- The compiled application JAVA code of the business logic POJO.
- Component configuration files. Each processor can have a configuration file, although adapters and streams do not need to have a configuration file if the default configuration is adequate and you do not plan to monitor these components.
- The EPN assembly file (a XML file).
- A MANIFEST.MF file with some additional OSGi entries.

After you assemble the artifacts into a JAR file, this bundle can be deployed to an Event Server so it can immediately start receiving incoming data.

WebLogic Event Server can provide a variety of JAVA APIs that you use in your adapter implementation or business logic POJO. These APIs can be packaged in the com.bea.wlevs.api package.

This section describes the APIs that will most typically be used in adapters and POJOs:

EventSink—Components that receive events from an EventSource, such as the business logic POJO, can implement this interface. The interface can have a callback method, onEvent( ), in which programmers put the code that handles the received events.

EventSource—Components that send events, such as adapters, must implement this interface. The interface can have a setEventSender( ) method for setting the EventSender, which actually sends the event to the next component in the network.

EventSender—The interface can send the events to the next component in the network.

Component lifecycle interfaces—If you want some control over the lifecycle of the component you are programming, then your component can implement one or more of the following interfaces:

DisposableBean—Use if you want to release resources when the application is undeployed. Implement the destroys method in your component code.

InitializingBean—Use if you require custom initialization after WebLogic Event Server has set all the properties of the component. Implement the afterPropertiesSet( ) method.

ActivatableBean—Use if you want to run some code after all dynamic configuration has been set and the event processing network has been activated. Implement the afterConfigurationActive( ) method.

SuspendableBean—Use if you want to suspend resources or stop processing events when the event processing network is suspended. Implement the suspend( ) method.

The SPRING framework implements similar bean lifecycle interfaces; however, the equivalent SPRING interfaces do not allow you to manipulate beans that were created by factories, while the WebLogic Event Server interfaces do.

Adapter, AdapterFactory—Adapters and adapter factories can implement these interfaces respectively.

EventBuilder—Use to create events whose JAVA representation does not expose the necessary setter and getter methods for its properties.

If your event type is represented with a JAVABean with all required getter and setter methods, then you do not need to create an EventBuilder.

EventBuilder.Factory—Factory for creating EventBuilders.

The following procedure shows suggested start-to-finish steps to create a WebLogic Event Server application, of one embodiment. Although it is not required to program and configure the various components in the order shown, the procedure shows a typical and logical flow.

It is assumed in the procedure that you are using an IDE, although it is not required and the one you use is your choice.

1. Set up your environment as described in Setting Up Your Development Environment.
2. Design your event processing network.
   This step involves creating the EPN assembly file, adding the full list of components that make up the application and how they are connected to each other, as well as registering the event types used in your application.
   This step combines both designing of your application, in particular determining the components that you need to configure and code, as well as creating the actual XML file that specifies all the components. You will likely be updating this XML file as you implement your application, but BEA recommends you start with this step so you have a high-level view of your application.
3. Design the EPL rules that the processors are going to use to select events from the stream.
4. Determine the event types that your application is going to use, and, if creating your own JAVA Bean, program the JAVA file.
5. Program, and optionally configure, the adapters that listen to the data feed data.
6. Configure the processors by creating their configuration XML files; the most important part of this step is designing and declaring the initial EPL rules that are associated with each processor.
7. Optionally configure the streams that stream data between adapters, processors, and the business logic POJO by creating their configuration XML files.
8. Program the business object POJO that receives the set of events that were selected with the EPL query and contains the application business logic.

The Event Server can provide a load generator testing tool that can be used to test your application, in particular the EPL rules. This testing tool can temporarily replace the adapter component in the application, for testing purposes only of course.

The EPN assembly file can be used to declare the components that make up the Event Server application and how they are connected to each other. The file can be used to register event types of your application, as well as the JAVA classes that can implement the adapter and POJO components of the application.

As is often true with SPRING, there are different ways to use the tags to define your event network. This section shows one way.

The following describes a way to create the EPN assembly file for your application:

1. Using a XML or plain text editor, create an XML file with the <beans> root element and namespace declarations as follows

```
<?xml version="1.0" encoding="UTF-8"?>
<beans xmlns="http://www.SPRINGframework.org/schema/beans"
    xmlns:xsi="http://www.w3.org/2001/XMLSchema-instance"
    xmlns:osgi="http://www.SPRINGframework.org/schema/osgi"
    xmlns:wlevs="http://www.bea.com/schema/SPRING-wlevs"
    xsi:schemaLocation="
  http://www.SPRINGframework.org/schema/beans
  http://www.SPRINGframework.org/schema/beans/SPRING-beans.xsd
  http://www.SPRINGframework.org/schema/osgi
  http://www.SPRINGframework.org/schema/osgi/SPRING-osgi.xsd
  http://www.bea.com/schema/SPRING-wlevs
  http://www.bea.com/schema/SPRING-wlevs/SPRING-wlevs.xsd">
...
</beans>
```

If you are not going to use any of the SPRING-OSGI tags in the XMLfile, then their corresponding namespace declarations, shown in bold in the preceding example, are not required.

2. If you have programmed an adapter factory, add an <osgi:service . . . > SPRING tag to register the factory as an OSGi service. For example:

```
<osgi:service interface="com.bea.wlevs.ede.api.AdapterFactory">
    <osgi:service-properties>
        <prop key="type">hellomsgs</prop>
    </osgi:service-properties>
    <bean
  class="com.bea.wlevs.adapter.example.helloworld.-
  HelloWorldAdapterFactory"
  />
</osgi:service>
```

Specify the WebLogic Event Server-provided adapter factory (com.bea.wlevs.ede.api.AdapterFactory) for the interface attribute. Use the <osgi-service-properties> tag to give the OSGI service a type name, in the example above the name is hellomsgs; you will reference this label later when you declare the adapter components of your application. Finally, use the <bean> SPRING tag can be used to register the adapter factory bean in the SPRING application context; this class generates instances of the adapter.

3. Add a <wlevs:event-type-repository> tag to register the event types that you use throughout your application, such as in the adapter implementations, business logic POJO, and the EPL rules associated with the processor components. For each event type in your application, add a <wlevs:event-type> child tag.

Event types can be simple JAVABeans that you either code yourself (recommended) or let WebLogic Event Server automatically generate from the meta data you provide in the <wlevs:event-type> tag. If you code the JAVABean yourself, a <wlevs:class> tag can be used to specify your JAVABean class. Optionally, the <wlevs:property name="builderFactory"> tag can be used to specify the SPRING bean that acts as a builder factory for the event type, if you have programmed a factory. The WebLogic Event Server can automatically generate the JAVABean class using a tag, such as <wlevs:metadata> tag, to list each property of the event type. The following example is taken from the FX sample:

```
<wlevs:event-type-repository>
    <wlevs:event-type type-name="ForeignExchangeEvent">
        <wlevs:class>
          com.bea.wlevs.example.fx.OutputBean$ForeignExchangeEvent
        </wlevs:class>
        <wlevs:property name="builderFactory">
            <bean id="builderFactory"
                class="com.bea.wlevs.example.fx.-
                ForeignExchangeBuilderFactory"/>
        </wlevs:property>
    </wlevs:event-type>
</wlevs:event-type-repository>
```

Creating the Event Types for additional information about creating event types.

4. For each adapter component in your application, a <wlevs:adapter> tag can be used to declare that the component is part of the event processing network. The id attribute can be used to give it a unique ID and the provider attribute can be used to specify the type of data feed to which the adapter will be listening. The <wlevs:instance-property> child tag can be used to pass the adapter the properties it expects. For example, the csv-gen adapter, provided by WebLogic Event Server can be used to test EPL rules with a simulated data feed, can define a setPort( ) method and thus can expect a port property, among other properties. The provider attribute can be used to specify the adapter factory, typically registered as an OSGi service; the csvgen keyword can also be used to specify the csvgen adapter.

The following example declares the helloWorldAdapter of the HelloWorld example:

```
<wlevs:adapter id="helloworldAdapter" provider="hellomsgs"
manageable="true">
    <wlevs:instance-property name="message" value="HelloWorld - the
currenttime is:"/>
</wlevs:adapter>
```

In the example, the property message can be passed to the adapter. The adapter factory provider can be hellomsgs, which refers to the type name of the adapter factory OSGI service. The manageable attribute, common to all components, can enable monitoring for the adapter; by default, manageability of the component can be disabled due to possible performance impacts.

5. For each processor component in your application, you can add a <wlevs:processor> tag. The id attribute can be used to give it a unique ID. The listeners attribute or <wlevs:listener> child tag can be used to specify the components that listen to the processor. The following two examples can be equivalent:

```
<wlevs:processor id="preprocessorAmer" listeners="spreaderIn"/>
<wlevs:processor id="preprocessorAmer">
    <wlevs:listener ref="spreaderIn"/>
</wlevs:processor>
```

In the examples, the spreaderIn stream component can listen to the preprocessorAmer processor.

6. For each stream component in your application, a <wlevs:stream> tag can be used to declare that the component is part of the event processing network. The id attribute can be used to give it a unique ID. The <wlevs:listener> and <wlevs:source> child tags can be used to specify the components that act as listeners and sources for the stream. For example:

```
<wlevs:stream id="fxMarketAmerOut">
    <wlevs:listener ref="preprocessorAmer"/>
    <wlevs:source ref="fxMarketAmer"/>
</wlevs:stream>
```

In the example, the fxMarketAmerOut stream can listen to the fxMarketAmer component, and the preprocessorAmer component in turn can listen to the fxMarketAmerOut stream.

Nest the declaration of the business logic POJO, called outputBean in the example, using a standard SPRING <bean> tag inside a <wlevs:listener> tag, as shown:

```
<wlevs:stream id="spreaderOut" advertise="true">
    <wlevs:listener>
        <!-- Create business object -->
        <bean id="outputBean"
            class="com.bea.wlevs.example.fx.OutputBean"
            autowire="byName"/>
    </wlevs:listener>
</wlevs:stream>
```

The advertise attribute can be common to all WebLogic Event Server tags and can be used to register the component as a service in the OSGI registry.

Event types can define the properties of the events that are handled by the Event Server applications. Adapters can receive incoming events from different event sources, such as JMS, or financial market data feeds. These events can be defined by an event type before a processor is able to handle them. An event type can be created either programmatically using the EventTypeRepository class or declaratively in the EPN assembly file.

These event types can be used in the adapter and POJO JAVA code, as well as in the EPL rules associated with the processors.

Events can be JAVA Bean instances in which each property represents a data item from the feed. A JAVA Bean class can be created that represents the event type and this class can be registered in the EPN assembly file. By creating your own JAVA Bean, you can reuse it and you have complete control over what the event looks like. Alternatively, the properties of the event type in the EPN assembly file can be specified using <wlevs:metadata> tags and let the Event Server automatically create JAVA Bean instances for quick prototyping.

In one embodiment, each Event Server application can get its own JAVA classloader and can load application classes using that classloader. This means that, in this embodiment, one application cannot access the classes in another application, in this embodiment. If an application (the provider) wants to share its classes, the provider can explicitly export the classes in its MANIFEST.MF file, and the consumer of the classes can import them.

The following example shows a JAVA Bean that implements the HelloWorldEvent:

```
package com.bea.wlevs.event.example.helloworld;
public class HelloWorldEvent {
    private String message;
    public String getMessage( ) {
        return message;
    }
    public void setMessage (String message) {
        this.message = message;
    }
}
```

The JAVA Beans can be made immutable for performance reasons because immutable beans help the garbage collection work much better. Immutable beans can be read only (only getters) and have public constructors with arguments that satisfy immutability.

Once you have programmed and compiled the JAVA Bean that represents your event type, you can register it in the EPN assembly file using the <wlevs:event-type> child tag of <wlevs:event-type-repository>. The <wlevs:class> tag can be used to point to your JAVABean class, and then optionally use the <wlevs:property name="builderFactory"> tag can be used to specify the SPRING bean that acts as a builder factory for the event type, if you have programmed a factory. If you want the Event Server to generate the bean instance for you, the <wlevs:metadata> tag can be used to group standard SPRING <entry> tags for each property. The following example shows both ways:

```
<wlevs:event-type-repository>
    <wlevs:event-type type-name="ForeignExchangeEvent">
        <wlevs:class>
            com.bea.wlevs.example.fx.OutputBean$ForeignExchangeEvent
        </wlevs:class>
        <wlevs:property name="builderFactory">
            <bean id="builderFactory"
                class="com.bea.wlevs.example.fx.-
                ForeignExchangeBuilderFactory"/>
        </wlevs:property>
    </wlevs:event-type>
    <wlevs:event-type type-name="AnotherEvent">
        <wlevs:metadata>
            <entry key="name" value="JAVA.lang.String"/>
            <entry key="age" value="JAVA.lang.Integer"/>
            <entry key="address" value="JAVA.lang.String"/>
        </wlevs:metadata>
    </wlevs:event-type>
</wlevs:event-type-repository>
```

In this example, ForeignExchangeEvent can be implemented by the ForeignExchangeEvent inner class of com.bea.wlevs.example.fx.OutputBean. Instances of AnotherEvent can be generated by WebLogic Event Server. The AnotherEvent can have three properties: name, age, and address.

The event types can be referenced as standard JAVA Beans in the JAVA code of the adapters and business logic POJO in your application. The following snippet from the business logic POJO HelloWorldBean.JAVA of the HelloWorld application shows an example:

```
public void onEvent(List newEvents)
    throws RejectEventException {
    for (Object event : newEvents) {
        HelloWorldEvent helloWorldEvent = (HelloWorldEvent) event;
        System.out.println("Message: " + helloWorldEvent.getMessage( ));
```

```
    }
}
```

The following EPL rule shows how you can reference the HelloWorldEvent in a SELECT statement:

SELECT*FROM HelloWorldEvent RETAIN 1 event

After you have programmed all components of your application and created their configuration XML files, the next steps can include:

- Assemble all the components into a deployable OSGi bundle. This step also includes creating the MANIFEST.MF file that describes the bundle.
- Optionally configure the server in your domain to enable logging, debugging, and other services.
- Deploy the application to WebLogic Event Server.
- Start WebLogic Event Server.
- Optionally start test clients, such as the load generator.

Exemplary Embodiment

An exemplary embodiment of a system using methods of the present invention is described below. The following exemplary embodiment is not meant to be limiting as to terms, definitions and the like. For example, language in this section is not intended to limit or define the claim terms but only to describe a particular exemplary embodiment. This section merely describes one exemplary way to implement the present invention. Other architectures implementing the methods and systems of the present invention can be done.

The following specifies the software architecture for real-time application server. The software architecture for a system can be the structures of that system, which comprise software elements, the externally-visible properties of those elements, and the relationships among them.

WLRT can be a JAVA middleware for the development and execution of event driven applications that perform event processing of high-volume streaming data in real-time.

The Real-time application server can provide an integrated stack, including components at the JAVA Runtime (i.e. JVM), a specialized infrastructure for real-time event stream processing, and an adequate programming model.

Event-driven applications are important, because the real-world is event-driven. Event-driven situations can be modeled by event-driven applications.

Event driven applications can be defined as sense-and-respond applications, that is, applications that react to and process events.

Events can be state changes that are meaningful to an observer. Events can be in the form of a message. Events may be simple or complex. Simple events can contain no meaningful member event. Complex events can contain meaningful member events, which can be significant on their own.

In one embodiment, events may be delivered through different mediums, two of which are channels and streams. Channels can be non-active virtual pipes, that is, a module is responsible for inserting data on one side of the pipe and another module is responsible for removing the data on the other side of the pipe. The data can be kept in the channel as long as it is not removed by a module. Channels may be bound, in which case it may stop accepting new data or purging existing data as it sees fit. Examples of channels can be JMS queues and topics. Streams can be active virtual pipes, that is, they can support a continuous flow of data. If a module does not directly listen to the stream, it is likely to miss data.

Event processing can be a computation step that uses events. In one embodiment, there can be four ways to process events:

Event passing:
  Events can be simply handled off between modules, there need be no pattern matching (i.e. as if a rule always evaluate to true), and it can mostly deal with simple events. Event-passing applications can be asynchronous, staged, and trigged by the arrival of one event from a single event stream or channel. Sometimes they are referenced as message-driven or document-driven applications.
  Examples are simple pub-sub applications.

Event mediation (or brokering):
  Events can be filtered, routed (e.g. content-based), and be transformed (e.g. enriched). Event mediators can be stateless, and deal with both simple and complex events. In one embodiment, however, they do not synthesize new complex events of their own. Messages can include simple events and may be split, but need not be combined (i.e. aggregated). Generally there is a single event stream or channel fan-in, and multiple event streams or channels fan-out.
  Examples are integration brokers.

Complex Event Processing (CEP):
  Events can be matched for complex patterns, and for complex relationships, such as causality, timing, correlation and aggregation. Simple and complex events can be received from several event streams and new complex events may be synthesized. CEP applications (i.e. agents) can be state-full. Events may contain generic data, such as causality information.
  In one embodiment, due to the timing and aggregation functions, CEP generally only works off streams, and not channels.

Non-linear Complex BPM:
  Event-based business processes modeling non-linear complex flows. The business process is able to handle unpredictable situations, including complex patterns, and complex event relations.

In one embodiment, event stream processing (ESP) is event processing solely on streams, as opposed to channels. Hence, CEP is part of ESP; however ESP can include other event processing types aside from just CEP.

An event-driven application can play the roles of event source, event sink, or both. An event source can handle off events to event sinks. Note that event sources do not necessarily create the event, nor events sinks are necessarily the consumer of events. Furthermore, event sources and event sinks can be completely decoupled from each other:

- In one embodiment, an event source does not pass control to event sinks, which is the case of service consumers delegating work to providers;
- In one embodiment, event sinks do not provide services to event sources, which is the case of providers that are initiated by consumers;
- One can add and remove event sources and sinks as needed without impacting other event sources and sinks.

Real-time can be the capability of a system on being able to ensure the timely and predictable execution of code. In another words, if a developer specifies that an object must be executed in the next 100 milliseconds (or in the next 100 minutes for that matter), a real-time infrastructure can guarantee the execution of this object within this temporal constraint.

Objects that have temporal constraints can be named schedulable objects. The system can measure how well the temporal constraints are being met by means of a particular metric, for example, the number of missed deadlines. Schedulers can order the execution of schedulable objects attempting to maximize these metrics. Schedulers can have different algorithms or policies to do this, one of which can be the Rate Monotonic Analyze, which uses thread priority as a scheduling parameter and determines that the highest priority should be associated to the shortest tasks.

CEP allows one to specify temporal constraints in the processing of events. For example, one can specify to match for an event that happens within 100 milliseconds of another event. Hence, CEP rules (e.g. queries) can be considered to be a type of schedulable object, and therefore, in one embodiment, a CEP agent is a real-time agent. In one embodiment, CEP can be further characterized by two functions, a guarding function, and an action function. The former can determine whether an event should trigger a response, and the latter can specify the responses (e.g. actions) to be taken if the guard is satisfied.

The system can support the development, and deployment of JAVA applications, and hence, in this regard, the CEP can be a JAVA application server, or rather as we have concluded previously, a real-time JAVA application server.

In one embodiment, CEP agents do not need the full services of a complete application server, for instance, most of the transactional and persistence container services are not needed. A minimal-featured application server can be used. This minimalist aspect can also be applicable to the real-time capability. A full set of real-time features that enable the development of any type of application may not be needed, but rather a minimal set of real-time features that enables the support of CEP agents can be used. A light-weight real-time application server can be used.

A system that supports CEP for JAVA-based applications can also support other event processing types, such as event passing and event mediation. Such a system can be a light-weight real-time JAVA application server for event-driven applications.

In one embodiment, a Real-time application server can receive real-time market data from single event stream, and waits for simple event patterns, such as equity value increasing or decreasing more than x percent over a fixed initial price. When pattern is found, the application can create and publish alarm message to configured destination.

A client application can dynamically initiate and terminate requests into server application, which can trigger the event matching. For example, a client may register the following watch request: notify if a stock increases more than 3% today considering opening price. Notably, the time constraint can be very coarse. Other examples of rules are:

Match price from cached value, or from relational store.

Check if equity has n consecutive increases or decreases over a period of time

Generally, these rules do not involve correlation across streams, chaining of rules, or time constraints.

Similarly to previous use-case, however in this case volume is higher and cannot be handled by a single server application.

One solution is to partition the load across different nodes. Partition can be determined by data and achieved by configuring the messaging layer for routing adequately.

Data can be partitioned arbitrarily, taking care not to separate data that would later need to be aggregated or correlated. They are issues aggregating data across partitions.

Nodes can be managed and configured (e.g. queries).

The system can be replicated using a hot stand-by node. Nodes can receive similar input streams, and executing the same processing to guarantee that both have the same internal state. However, in one embodiment, only the output of the primary system is used. A singleton service can be responsible for verifying if the primary system is up, and if not, switch to the output of the stand-by system.

In one embodiment, during fail-over, some events may be lost. There need be no need to catch-up to lost events.

In one embodiment, the system has to perform a function within a fixed time. This is slightly different than having to perform a function with the best possible latency. In the latter case, it is desirable to have the result as quickly as possible, in the former case it is mandatory to have the result within a time period otherwise it is not useful anymore.

For example, consider a system that is calculating the price index from a large set of stocks and their historical prices. Assume it generally takes 30 seconds to calculate the index, and the index is kept up-to-date every one minute, in another words, the system spends 30 seconds calculating the price, waits another 30 seconds for new data to arrive, and starts the calculation process again. However, if the calculation has not been finished within 1 minute, it makes more sense to stop the current calculation, and re-start the process again, but now using the most up-to-date data.

A less common variant of this are functions that have a fixed execution cost.

Consider a system that is monitoring stock prices and correlating the changes of prices to company news.

The stock price is processed and the result is forwarded to external applications that use it for providing quotes, among other things. The processing of the stock prices is of high priority and cannot be delayed.

As part of the processing of the stock price, the system can try to correlate the price changes to news as an optional property of the final price that is eventually forwarded to the external applications.

The news can also undergo some amount of processing, for example to search for relevant information.

Both the stock price processing and the news processing can be collocated otherwise the forwarded processed price would not be able to include the most up-to-date news, however when the load in the system peaks, the system can give higher priority to the processing of the stock symbols and only process the news as possible.

Consider a system that is processing stock ticks. How does the end-user know how many different symbols the system is able to cope with? This number also varies depending on the system load. At peak times, the number of symbols that can be handled is less.

The end-user can associate a worst-case acceptable time for the processing, and then the system can continuously monitor itself and if it is not meeting the worst-case time, it can raise alerts that would allow the application to reconfigure itself by re-partitioning the symbols across different nodes.

A Real-time application server can receive foreign exchange quotes from different markets, and check for arbitrage opportunities. This can be done by checking if the same cross rate (e.g. US for Euro) is quoted x percent higher or lower by different markets in a sliding window of t time (e.g. 50 milliseconds). If this discrepancy is found, buy and sell transactions can be initiated.

A Real-time application server application can probe inbound TCP/IP packets. The application can monitor if any single external client (i.e. same source IP) is constantly sending packets to different destination ports, which characterizes a mechanism for detecting network vulnerability. If such an external client is found, firewall can be configured to block its IP.

An application can monitor system level performance of distributed system, such as CPU and memory usage, and application level performance, such as application latency.

An application can generate an alert if bottlenecks are identified, such as thread being blocked more than n milliseconds. An alert can contain enough information to allow bottleneck to be fixed. In one example, one can be able to correlate thread to application, that is, to the processing of a certain event at a certain stage of the application execution path.

Monitor request-response messages part of a MOM or ESB. Generate alarms if response for a request has not been received within a configurable threshold. Alarms can be used to determine nonconforming quality of service problems. Here are some common scenarios attributed to CEP:

Retail management of misplaced inventory and detection of shoplifting combined with RFID technology;
Computer network monitoring for denial of services and other security attacks;
Monitoring the position of military vehicles and soldiers equipped with GPS for their real-time positioning;
Tracking if the right medication are being taken at the right time by the right patient in the health-care industry;

Common scenarios, such as the first use-case, can be highly optimized for low latency and determinism.

For example, the first scenario can be configured to avoid all buffering, to have no thread context switch, simple data normalization, and minimal number of locking. With a performing inbound channel, real-time application server can process this scenario under 10 milliseconds, excluding the time spent in the user code itself.

As the scenario becomes more complicated, for example when having multiple streams, and applications, the processing time can increase.

A common use-case for an application server is to serve web requests for a large number of clients. For this particular scenario, it is typically preferable to serve as many concurrent clients as possible, even if the latency, that is, the time it takes to a serve a particular request, may be slightly decreased.

This is not the case for a Real-Time Application Server. For a Real-Time Application Server, it is preferable to serve a particular request as quick as possible (i.e. low latency), even if the overall throughput of the system is degraded.

Lower latency can be achieved by profiling real-time application server for latency instead of throughput. Some of approaches for doing so can include:

Minimize the number of thread context switch, which also serves to increase data locality.
Keep state data small, to improve hardware cache (i.e. data locality).
Avoid pipelining of requests The infrastructure code for a real-time application server can be profiled for latency. In addition, a set of guidelines on how to develop low latency user applications can be published.

Real-time applications can have strict timing requirements, that is, they have to execute application code under some determined, known latency. Unpredictability, or jitter, can cause latency increase.

There are several possible sources of unpredictability in a JAVA software application:

Garbage collection
Priority inversion caused by locking contingency
Lazy initialization of structures and memory allocation
Unbound data structures (e.g. queues)
Runtime exceptions and exceptional scenarios The infrastructure code for a real-time application server can be profiled to minimize these sources of jitter.

Latency and determinism are not easily observed system functions. For example, POCs for real-time application server are usually very technical and demand the presence of a real-time application server engineer onsite.

Hence, there is a need for a development tool that helps one understand the latency problems of an application. Unfortunately, existing profiling and monitoring tool only allows one to see where running time is spent. There are currently no tools to allow one to see where dead time is spent.

A Latency Analysis tool can address this problem. This latency analysis (development) tool (LAT) can:

Monitor JAVA block (i.e. synchronized), lock (i.e. JAVA.concurrent) and wait time (i.e. sleep) per thread over a configurable threshold (e.g. 20 milliseconds);
Monitor Virtual Machine (VM) block, lock, and wait time per thread over a configurable threshold (e.g. 20 milliseconds);
Monitor I/O block, and wait time per thread over a configurable threshold (e.g. 20 milliseconds);
Monitor thread yield and resume events;
Provide a coloring feature settable in threads so that higher level applications can correlate transactions that cross threads. Thread coloring can be used to measure the actual the latency of a transaction;
Access to the LAT information can be provided by a native API, which can include a filtering mechanism that can be used to decrease volume of data.

The typical usage of LAT can be at design-time, as a development tool that helps the authoring of low-latency applications.

A Real-Time Application Server could also use LAT at runtime, to provide latency events to real-time application server applications that wish to constantly monitor latency and take dynamic actions. For this use-case, there is a need of a JAVA API; however care must be taken to avoid a bad feedback loop in this case.

A Real-Time Application Server can provide a thread executor, i.e. work manager, whose threads can be assigned to execute on a specific priority. This prioritized executor can then be associated to different JAVA objects. By doing so, one can create prioritized end-to-end execution paths in a Real-Time Application Server.

For example, one can define the execution path that process news to be of less priority of the execution path that process stock ticks.

In addition, prioritized end-to-end execution paths can synchronize using priority-inversion avoidance synchronization. For example, if both the news processing path and the stock ticks execution path need to synchronize to the same socket, the latter must be given priority over the former. The configuration of the synchronization mechanism to have priority-inversion avoidance quality for prioritized executions paths should be done automatically by the real-time application server infrastructure. This means that JAVA objects synchronizing outside of the prioritized execution path do not need to have this quality.

The priority of the thread executors for a real-time application server application can be established by the user. Another option is to allow the real-time application server infrastructure to deduce what should be the best priority that allows the real-time application server application to maximize over some metric, i.e. few number of dead-line misses, based upon some set of heuristic or policies.

In one embodiment, since the real-time application server infrastructure is aware of the components that make a real-time application server application (e.g. adapters, processors, client POJOs), the infrastructure can monitor the latency time of the execution paths and use Rate Monotonic Analysis to determine what should be the priority of each path.

The real-time application server infrastructure can also monitor the latency of the execution paths in combination with the Hot Beans deadlines and perform an online feasibility analysis, for example informing that if execution path I executes around its average latency time, then the Hot Bean H would never meet its deadline.

Event pattern matching is the ability to identify a set of events by comparing attributes of the events with user-specified templates, or patterns.

A Real-Time Application Server can support the declarative specification of pattern matching for the streaming events.

Event aggregation is the ability to deduce a higher (abstraction) level event from a set of lower level events. Some examples are:

Buy stock event, sell stock event, and acknowledge event can be aggregated into an exchange stock event.

A series of stock quote events can be aggregated into a single average price stock event.

Event aggregation allows one to construct a business perspective of the event driven system.

A Real-Time Application Server can support the declarative specification of event aggregation. Real-time application server should provide the usual aggregation functions, such as average, count, minimum, and maximum. Real-time application server should also support the drill down from an aggregated event to its triggering events.

Event correlation is the ability to connect events to each other that share some common knowledge, or attribute. These events are generally at the same level of abstraction.

A similar concept to event correlation is the join operation of a DBMS. A join operation connects tuples of different tables that share the same value for a specific set of columns.

WLRT can support event correlation between the streams of events, however, due to its complexity; we may limit some of the usage of this functionality until we are able to fully optimize it.

Event correlation need not dictate causality.

The source of data for real-time application server applications can be from continuous stream of events, hence the event-related operations, such as event matching, event aggregation, and event correlation; can be continuously executed in the stream of events.

At a discreet point of time, the event processor can act upon a fixed set of events, logically including the first event received up to the last event received at that point of time.

It is sometimes useful to restrict this set of events on which the processor acts upon. This can be done by specifying sliding windows that include the last set of events received in some arbitrary time duration, namely a time-based sliding window, or plainly just the last set of events received, namely a tuple-based sliding window.

For time-based sliding windows, the time granularity of at least milliseconds can be supported (i.e. underflow).

There are no specific upper limits (i.e. overflow) for the sliding windows, it being restricted by the available memory. In the case of overflow, there are currently no requirements for caching the data and moving it to secondary storage as a way of scaling-up.

Other sources of data may be needed for event processing. For example, one may need to correlate an event with a database row, or to color an event with attributes from a cache, or to use some context state set by the user.

A Real-Time Application Server can provide declarative access to external data sources. The external sources may be wrapped in a common abstraction, such as a map abstraction, or JDBC.

A Real-Time Application Server event processor should also support a context memory, which could be used across events.

A Real-Time Application Server need not provide the (full) JAVA runtime context to the event processors. Typically, an event driven architecture can be composed of several processing steps intermingled with user logic. For example, one can imagine a set of several event processors, where each aggregates events into a higher level of abstraction and feeds them into another processor; in between the processors there may be user code performing auditing, reporting, validation, etc.

This arrangement of event processing components is called an event processing network.

A Real-Time Application Server can provide the authoring of event processing networks, supporting the horizontal composition of processing, as well as the vertical layering of processing.

The topology of an event processing network is dynamic; one can add and remove components as needed.

A Real-Time Application Server can support the declarative specification of the EPN, and (runtime) dynamic modifications by providing a JAVA API. For the latter, real-time application server infrastructure can use lock-free structures (e.g. JAVA.util.concurrent).

In one embodiment, the real-time application server developer should be able to author real-time applications without having to deal with the complexity of real-time.

Real-time programming is generally complicated; one has to deal with managing their own memory, modeling thread prioritization and thread scheduling, priority inversions, pre-allocation of data structures, etc.

It is the intent of real-time application server to abstract these difficulties away from the developer. Hence, real-time application server need not be implementing JSR-1.

Memory can continue to be managed by the JAVA runtime using the DGC; or in the future also by the infrastructure using TSS. Some real-time concepts e.g. thread prioritization; can be surfaced to the user.

A Real-Time Application Server can provide a declarative language for specifying event processing. Specification should be trivial for simple tasks. Complex tasks should be possible. There are currently no standards for Event Processing Language (EPL). Some of the existing EPLs are: CQL (Stanford's STREAM project), CCL (Core18), iSphere's EPL, and RAPIDE (David Luckham).

Application developers do not want to be tied to middleware technology. Developers want to implement their business logic in a way that they are able to move to different platforms as needed, without having to change their code. Part of this trend was caused by the seeming complexity of J2EE, where one ended up having to mix together business logic with technology-specific code, such as it is the case of Enterprise JAVA Beans (EJBs).

In light of this problem, we have seem the emergence of light-weight development frameworks, such as the SPRING framework, in which dependencies, or rather, services are injected into the business objects by non-intrusive means, the most popular being external XML configuration files. This mechanism is popularly called dependency injection, and this form of programming where business logic is kept into technology agnostic objects is called POJO programming.

Real-Time Application Server applications can be based upon POJO programming. Business logic can be implemented in the form of POJOs, and the POJOs are injected with the real-time application server services as needed.

A final aspect of programming real-time application server applications is that these applications can be executed in a somewhat container-less environment. Whereas in J2EE application objects are dropped into a J2EE container and inherit a set of capabilities or services, such as security, transaction, threading; real-time application server applications need to be injected or configured with the services that can be used. In a Real-Time Application Server, one can get what one uses, there is typically no magic. For example, real-time application server applications can be explicitly injected with the Executor that can manage its threading model. This approach is transparent, thus making real-time application server applications more flexible and easier to integrate with other technologies.

In practical terms, POJO programming can mean:
At no time objects containing business logic need to implement technology specific JAVA interfaces;
WRLT services (e.g. event processor) are abstracted into interfaces; there is no need for the application objects to directly reference implementation components;
Dependency injection is used to assemble and configure the application;
Infrastructure services are reference-able and can be replaced by other equivalent services.

Real-Time Application Server applications can be assembled from provided services, such as adapter and processing services, and then configured (e.g. TCP/IP port number for a socket adapter).

The supported declarative mechanism for both assembly and configuration can be:
SPRING-beans module of the SPRING framework. This mechanism is particularly suitable for SPRING-based applications.

Depending on its availability, we can also like to use SCA as our assembly and configuration model.

In the context of SCA:
Real-time application Server applications can be represented as SCA modules.
Real-time application Server services, e.g. adapters, processors; are specified as SCA components. User code, e.g. POJO, is also an SCA component.
Real-time application Server Adapters may be specified as SCA entry points, if the real-time application server applications need to be wired to external client modules.
User code, e.g. POJO, may optionally reference to other non-Real-time application Server services directly or as an SCA external service.

If real-time application server is hosted in an OSGi Service Platform, then the assembly configuration model of choice, i.e. SPRING-beans or SCA, can be integrated with OSGi. In another words, these mechanisms can map seamlessly their services to OSGi services. This can be done by using the OSGi Framework API (OSGi Service Platform Core Specification Release 4). The OSGi API can provide us a standard-based and open model for dealing with services. It allows us to support different assembly and configuration mechanisms, even third-party ones.

Real-time application Server need not support the use of the OSGi Configuration Admin Service or of the OSGi Declarative Service (OSGi Service Platform Service Compendium Release 4).

There is nothing preventing one from using other programming models, such as EJB, to assemble and configure applications that use real-time application server services. Specially, EBJ 3.0, which makes use of JAVA Metadata, is also a reasonable alternative.

Using SPRING and (Open Services Gateway initiative) OSGi, assembly can be achieved by retrieving OSGi service objects from the OSGi service registry, and wiring the service objects together using SPRING's dependency injection. Configuration can also be achieved by using dependency injection directly on the service objects. This approach can mandate that the service object expose JAVA bean methods for its configuration, including factory-like methods when new instances of services are needed. For example, it means that we can register the Work Manager Factory as an OSGi service, and that the Work Manager should provide public methods for setting the max and min thread pool size.

By registering factories as services, we can allow the client applications to create new service instances as needed. One problem with this approach is if applications need to share the same service instance. For example, this would be the case if one wants to configure all real-time application server applications of an OSGi node to use the same work manager. However, we can work-around this issue by having a master configuration application that registers the service instance to be shared directly in the OSGi service registry in addition to the service factory.

An alternative approach to registering factories as services can be to use OSGi's service factory facility. However, OSGi caches the service object created by the service factory per bundle, in another words, it would not allow one to create more than one service object from the service factory in the same bundle, hence this may not be usable.

Dynamic (i.e. runtime) update to the assembly and configuration of real-time application server applications is possible, but may be restricted to certain functions. For example, it is allowed to change the topology of the EPN by adding or removing new adapters or client POJOs. However, it is not allowed to change the priority of a thread Executor, or to change the port of an established I/O connection, as these operations are disruptive.

Dynamic updates can be realized through a real-time application server JAVA API. Methods that do not allow changes after their initialization can throw an IllegalStateException. A real-time application server can also allow configuration updates through JMX. In this case, a real-time application server JMX Configuration Provider can interface with a Core Engine Configuration Manager. In the service-side, we intend can use Core Engine SDS to update the service configuration.

A Real-time application Server need not create its own deployment model, but can leverage that of its hosting environment.

The deployment unit for real-time application server applications can be the OSGi bundle. OSGi bundles are the unit of modularization used for deploying JAVA-based applications in an OSGi Service Platform. A bundle can be deployed as a JAVA Archive (JAR) file.

Real-time application Server applications can be deployed into a Core-engine backplane, which is an implementation of the OSGi Service Platform, and contains the real-time application server infrastructure support. The real-time application server infrastructure can include the real-time application server event-driven environment (EDE), which provides support for real-time event processing.

An OSGi bundle can include:
User code (e.g. JAVA classes), user libraries (e.g. JAR files), and user resources (e.g. HTML files, XML files);
Manifest.mf file describing the contents of the JAR file, and providing information about the bundle, such as references (e.g. dependencies) to real-time application server services or other OSGi services;

An optional OSGi directory providing further OSGi information;

A real-time application server application deployment unit (e.g. OSGi bundle) can be created:

By using a Core Engine Bundler command-line tool;
By using an Ant task, which wraps the Bundler tool;
Manually by the application developer;

A real-time application server need not be providing any Eclipse editor or builder for creating real-time application server application deployment units.

A real-time application server application deployment unit can be installed (i.e. deployed), uninstalled (i.e. un-deployed), and updated (i.e. redeployed). The runtime state of a real-time application server application is described in section 4 (Lifecycle Service) of the OSGi Service Platform Core Specification Release 4 and can include: INSTALLED, RESOLVED, STARTING, ACTIVE, STOPPING, and UN-INSTALLED.

The lifecycle operations (deployment, un-deployment, and re-deployment) of real-time application server applications can be realized:

Programmatically by another OSGi bundle using the OSGi Framework API;

By using a Core Engine Deployer command-line tool, however in this case update is not supported. The supported operations are install, start, stop, uninstall. Remote usage is supported, and is likely to be used when deploying real-time application server applications to multiple nodes.

By using an Ant task, which wraps the Deployer tool;

Statically by manually editing the Core Engine backplane load file to include the real-time application server application and then using the Core Engine Launcher command-line tool;

In one embodiment, regarding the update of real-time application server applications, it can be possible to:

Redeploy a real-time application server application, which may have changed its dependency list (e.g. added a dependency to a new adapter type) and its configuration (e.g. EPN) without having to bounce the underlying server infrastructure (i.e. Core Engine backplane). The latter is explained in the previous section. For the former, currently one would have to uninstall and then re-install an application.

Before real-time application server applications can be deployed and started, the real-time application server infrastructure (i.e. Core Engine backplane) must be bootstrapped. Core Engine backplane can be bootstrapped (e.g. launched) by using a Core Engine Launcher command-line tool. The Core Engine Launcher specification describes the process of launching Core Engine and the schema of its load and configuration files.

The real-time application server user (i.e. administrator) can be able to manage (e.g. start, stop) several concurrent instances (not withholding licensing restrictions) of the real-time application server infrastructure. The administrator can do this by using the Launcher tool, and the appropriate parameters. For instance, the administrator should configure different logging files for each real-time application server infrastructure instance. The administrator can understand the Launcher specification, and be responsible for specifying the appropriate modules to run, system properties, etc.

A Real-time application Server can provide a default "start" script to launch the real-time application server infrastructure using the default parameters, such as logging to the current directory and using the bundles.

In one embodiment, the Real-time application Server is not supporting the use of an Initial Provisioning Service. Also, real-time application server is not providing any wrapping of a Launcher, or providing its own bootstrapping facility for the real-time application server infrastructure.

An Ant task can create a domain-like directory for real-time application server applications. This domain can consist of a pre-configured launch.xml configuration file that includes the real-time application server application being developed, and a default start script, among other artifacts.

In one embodiment, a Real-time application Server need not be a full-fledged enterprise development environment, and real-time application server does not intend to replace J2EE. Hence, real-time application server should be able to integrate to other technologies.

For example, in the context of a real-time application server application, it should be possible to use JMS, Web-Services, Aspect Oriented Programming (AOP), security providers, etc; by manually including these technologies in the real-time application server application.

It can be possible to embed real-time application server within other technologies. For example, providing some amount of code, it should be possible to include the real-time application server event processor within a web application.

In summary, real-time application server can be modularized and open so as to allow its usage and integration with other technologies. This is facilitated by the fact that real-time application server is modeled so as to be hosted by an OSGi Service Platform.

Real-time applications are generally asynchronous, as this typically performs better.

User code in real-time application server applications can be in the form of POJOs. The user code can register to listen to streams that contain processed events. By doing this, the user code can be trigged and receive these events as they become available in the observed streams. This is essentially a push-model approach and can follow the Observer design pattern.

A Real-time application Server need not directly support a pull-model approach, in which user code would be able to request for processed events.

Real-time application Server can be provided as a set of loosely-coupled services.

The main real-time application server services can be:
Event processing (i.e. matching, correlation, aggregation)
Prioritized bounded execution paths
Schedulable objects (i.e. Hot Beans)
Rate Monotonic Scheduler
Online Feasibility Analyzer The real-time application server services themselves, particularly the event processor, can be modularized components. They can be hosted in different infrastructures, such as a J2EE container (i.e. WLS), or an OSGi Service Platform (i.e. Core Engine backplane).

The Real-time application Server can receive events originating from a diverse set of event sources. Examples of event sources are: proprietary data format over TCP/IP sockets, JMS destinations; market feed handlers, TIBCO rendezvous, etc.

The Real-time application Server can allow different transport handlers and data format encoders and decoders to be plugged into its infrastructure. In other words, one can be able to adapt proprietary protocols and data formats into the real-time application server. This can be realized by providing an adapter service provider interface (SPI).

The Adapter SPI can be minimal, and need not replace JCA, or duplicate JBI.

Adapters are mostly needed for the inbound data. The inbound entry-point can be tightly coupled with the application (e.g. Message Driven Beans (MDBs) in J2EE). Outbound interfaces can be loosely coupled, and can be integrated into the application directly in the user code (i.e. 5.3.7 Integration to other Technologies).

The real-time application server infrastructure can be designed in such a way to allow for the pluggability of event processors. Different event processors support different event processing languages.

Pluggability can be provided at two levels: at the EPN level, where one can support additional processors type; and at a runtime framework for continuous query, to a lesser extent.

Caching is an important and popular approach used to lower transaction latency. Caching can be realized within the infrastructure, as well as by the user application itself.

Particularly within the infrastructure of the real-time application server, caching can be used:
- As a mechanism for scaling-up by allowing real-time application server to handle more events that can be stored in-memory at a time;
- As a efficient mechanism of logging (i.e. persisting) events for future auditing by using a write-behind approach;
- As a mechanism for replicating (and distributing) events and internal state using a distributed cache;

With regards to the user application itself, it is expected that caching can be used to store the application state. This is principally important since real-time application server applications can be state-less. It can be common to distribute the cache, to make the information available.

In one embodiment, a real-time application server need not provide a native caching implementation. However, real-time application server applications can use third-party caching technologies (e.g. Tangosol). In addition, the real-time application server can provide hooks to allow caching to be incorporated in the infrastructure of a real-time application server. This can be done by providing a pluggable stream abstraction.

A real-time application server can allow the:
- Monitoring of the lifecycle of real-time application server applications (i.e. start, stop, installed, un-installed). It should be possible to leverage OSGi's infrastructure support for monitoring OSGi bundles.
- Real-time application server infrastructure modules can log info, warning, and error messages. The application developer can configure the level of logging wanted.

Real-time application server can support the localization of runtime error messages.

This can be based upon I18N.

A real-time application server can support the licensing of its modules.

In one embodiment, there are no direct atomicity requirements for the real-time application server services. For example, if a real-time application server application can be composed of several processing steps, these steps need not be atomic, should a latter one fail, former ones need not be rolled back.

However, a real-time application server need not prevent user objects from participating on a transaction if they wish to do so and have access to some Transaction Manager. A real-time application server need not provide a native Transaction Manager.

In one embodiment, there is no need to persist the current state of the real-time application server. If real-time application server is restarted, processing can be reset to its beginning. For example, if the real-time application server is waiting on two events, and the first one had already been received, in the case that real-time application server is restarted; first event may need to be received again.

Note that this is not related to the configuration of real-time application server. The configuration itself may need to be persisted. If new rules are dynamically added, they should not be lost by the restart of real-time application server.

Event causality is the relationship where an event is caused by another event.

Some examples are:
A request event causes a response event.
A buy event causes a sell event.
Non-causality, that is, the fact that an event is not related to another event, is also an important relationship of events.

The events of an event causality relationship can generally be of the same level of abstraction.

Obviously, for an event causality relationship to exist between events, it must first be established between them. The establishment of event causality can be done by the event processor itself, however this means that event causality can be a two step process, that is, a first level of event processing establishes that event causality exists between events, and then a second level of event processing may use event causality for further processing.

This is different than the other event-related operations (e.g. event aggregation), where their execution already yields a useful result, and does not mandate further processing to add value to the application.

Hence, due to its two step nature, it is not clear if event causality can be an important feature.

One may replicate a real-time application server application across several nodes to achieve high availability using a hot standby approach. Using this approach, one still needs a way of determining which node is the primary node, and to fail-over to a secondary node should the primary node go down. This is generally referenced as a cluster singleton service. The primary and the secondary nodes of the cluster do not need to share state.

A real-time application server support a singleton service, or provide any other direct support for replicating real-time application server applications.

Another approach for achieving high availability is by creating redundant real-time application server nodes, and failing-over to them as needed. In one embodiment, the redundant nodes are not in a hot standby mode; hence the nodes of this cluster generally do share some state.

A real-time application server can provide support for redundancy.

Event processing languages can allow one to specify temporal constraints to the processing of events. Similarly, one can extend this concept to JAVA objects, by assigning temporal constraints to the execution of JAVA methods.

This would allow one to directly monitor the execution of JAVA methods and guarantee that they are executed completely in a timely fashion.

Time-constrained JAVA objects, or Hot Beans, are JAVA Beans whose methods have been annotated with a deadline parameter. The deadline is a relative time in relation to the start of the execution of the annotated method (absolute time won't generally be useful). If the deadline is not met by the time the method finishes execution, either successfully by returning or unsuccessfully by propagating an exception, then a missed deadline action is taken. The missed deadline action can be configured to interrupt the current execution of the method by raising a MissedDeadlineException and then to call a missed deadline handler.

The deadline annotation is an example of a scheduling parameter. Other scheduling parameters, such as a tardiness annotation, could be specified in future releases.

The deadline annotation can be associated to a class or to individual methods, in which case the method annotation takes precedence. The missed deadline handler must be a method on this same class.

This feature is a simplification of the more general Schedulable Objects feature of JSR-1.

Load balancing can be an approach for scaling real-time application server systems. It can be achieved by replicating real-time application server nodes and load balancing the events to the nodes. The load balancing feature could be part of a load balancing event stream implementation.

Another approach for achieving higher scalability and performance is to divide processing queries into stages, similarly to an instruction pipeline, and distribute the execution of these stages across a clustered set of real-time application server nodes.

A real-time application server need not provide a rich integrated development environment.

It is expected that real-time application server applications can be developed in Eclipse or BEA Workshop for Eclipse as JAVA projects. However, no real-time application server specific Eclipse perspective, editor, or Eclipse builder need be provided.

Note that Ant tasks for compiling the EPL files, packing and deploying real-time application server applications can be provided.

Figure 5:
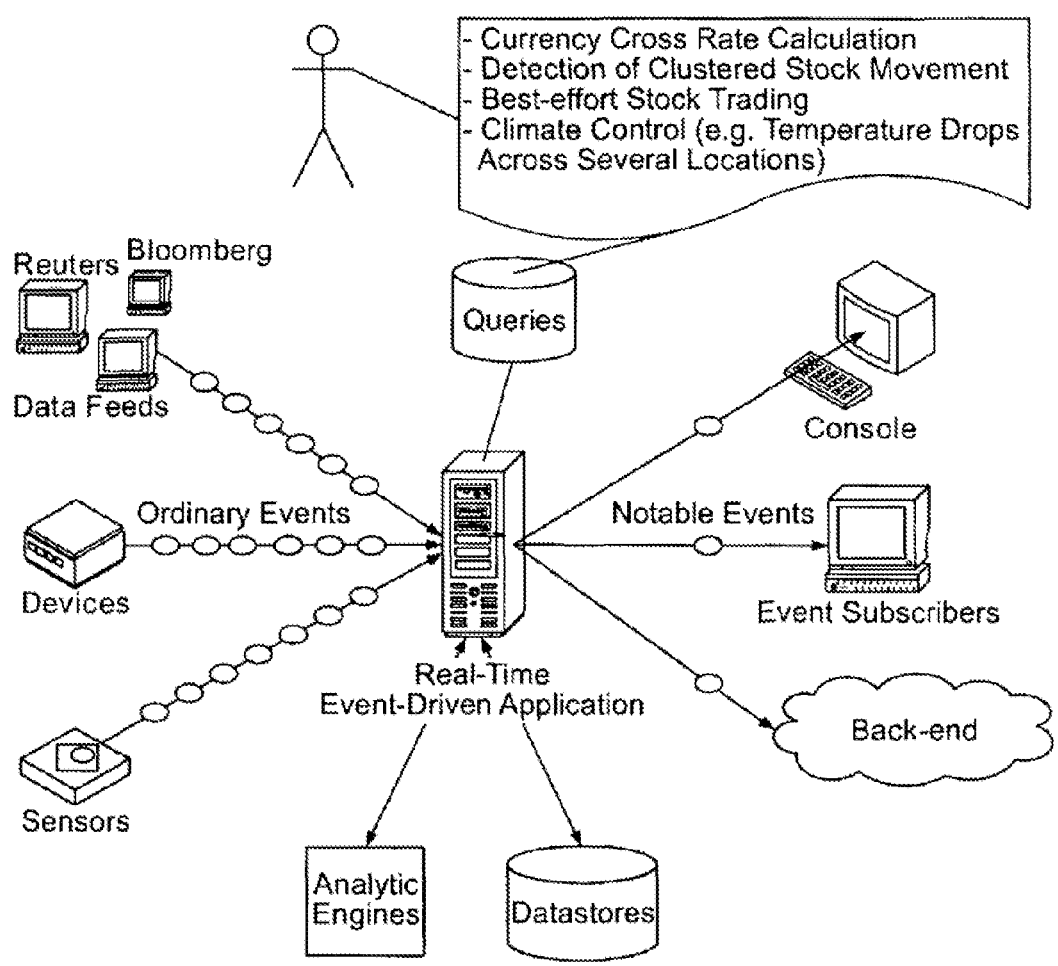
FIG. 5 illustrates a high level view of an event-driven system.

FIG. 5 illustrates a high level view of an event-driven system. An event-driven system can generally be comprised of several event sources, the real-time event-driven (WLRT) applications, and event sinks. The event sources can generate streams of ordinary event data. The real-time applications server's applications can listen to the event streams, processes these events, and generate notable events. Event sinks can receive the notable events.

Event sources, event-driven applications, and event sinks can be decoupled of each other; one can add or remove any of these components without causing changes to the other components. This is an attribute of event driven architectures.

Event-driven applications can be rule-driven. These rules, or queries, which are persisted using some data store, can be used for processing the inbound stream of events, and generating the outbound stream of events. Generally, the number of outbound events is much lower than that of the inbound events.

A real-time application server is a middleware for the development of event-driven applications. A real-time application server application is essentially an event-driven application.

Next, consider the real-time application server application itself, which is hosted by the real-time application server infrastructure (i.e. event-driven environment).

Figure 6:
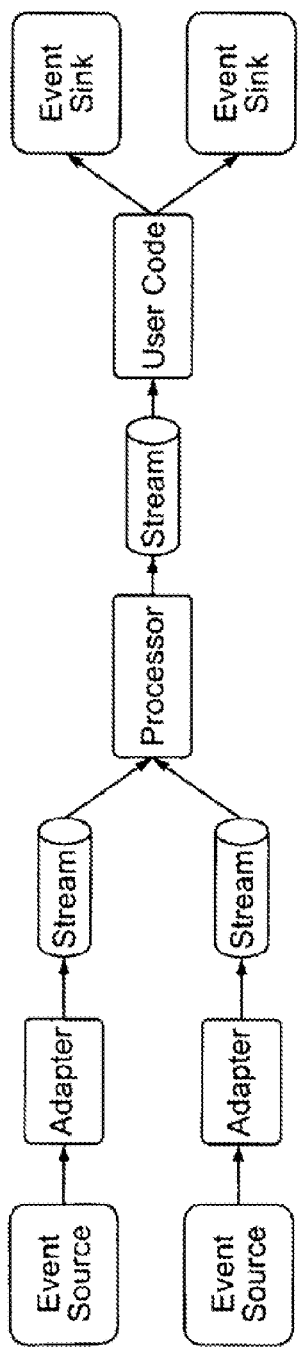
FIG. 6 illustrates an exemplary application model of one embodiment.

FIG. 6 illustrates an exemplary application model of one embodiment. A real-time application server application can be viewed as comprising of four main component types. Adapters can interface directly to the inbound event sources. Adapters can understand the inbound protocol, and can be responsible for converting the event data into a normalized data that can be queried by a processor (i.e. event processing agent, or EPA). Adapters can forward the normalized event data into Streams. Streams can be event processing endpoints. Among other things, streams can be responsible for queuing event data until the event processing agent can act upon it. The event processing agent can remove the event data from the stream, processes it, and may generate new events to an output stream. The user code can register to listen to the output stream, and can be trigged by the insertion of a new event in the output stream. The user code can be generally just a plain-old-JAVA-object (POJO). The user application makes use of a set of external services, such as JMS, WS, file writers, etc; to forward on the generated events to external event sinks.

Figure 7:
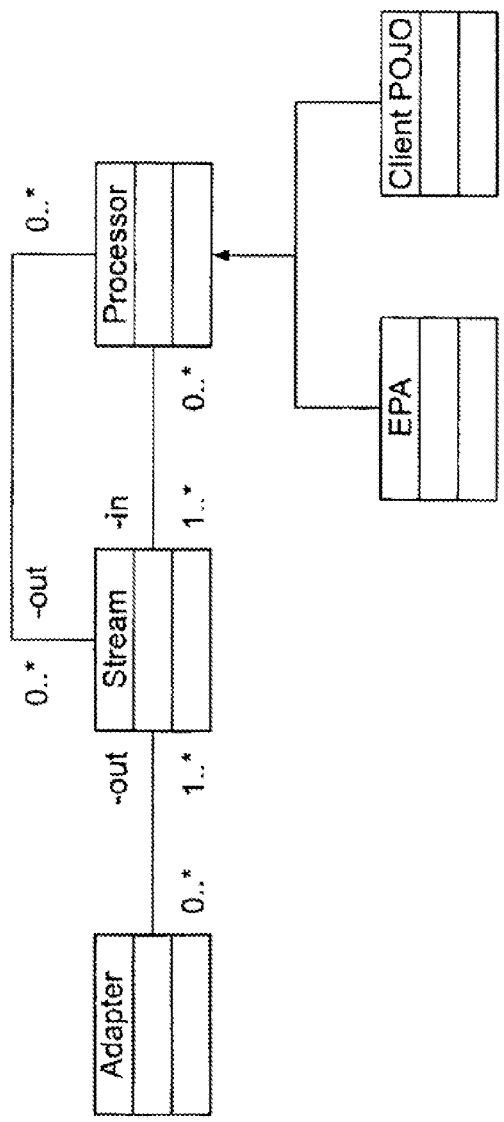
FIG. 7 illustrates an exemplary UML class diagram for the logical components of a real-time application server.

FIG. 7 illustrates an exemplary UML class diagram for the logical components of a real-time application server.

Client POJOs can be conceptually JAVA-based user-specific processors. Event Processing Applications (EPAs) can be generic processors whose rules are specified in some declarative form.

Adapters, Streams, EPA, and Client POJOs can be connected arbitrarily to each other, forming EPN. Examples of topologies of EPNs are:

Adapter→Stream→Client POJO

Scenario: no processing is needed, aside adaptation from proprietary protocol to some normalized model.

Adapter→Stream→EPA→Stream→Client POJO

Scenario: straight through processing to user code.

Adapter→Stream→EPA→Stream→Client POJO→Stream→EPA→Stream→Client POJO

Scenario: two layers of event processing, the first EPA creates causality between events, and the second EPA aggregates events into complex events.

Adapter→Stream→EPA→Stream→Client POJO|→EPA→Stream→Client POJO

Scenario: two EPAs are listening to the same inbound stream, but perform different processing and outbound to different user code.

EPNs can have two important attributes.

First, event processing networks can be used to create hierarchy of processing agents, and thus achieve very complex processing of events. Each layer of the EPN can aggregates events of its layer into complex events that become simple events in the layer above it.

A second attribute of event processing networks is that it helps with integrability, that is, the quality of having separately developed components work correctly together. For example, one can add user code and reference to external services at several places in the network.

To provide real-time Quality of Service (QoS), we can require real-time support at all levels of the software stack.

Figure 8:
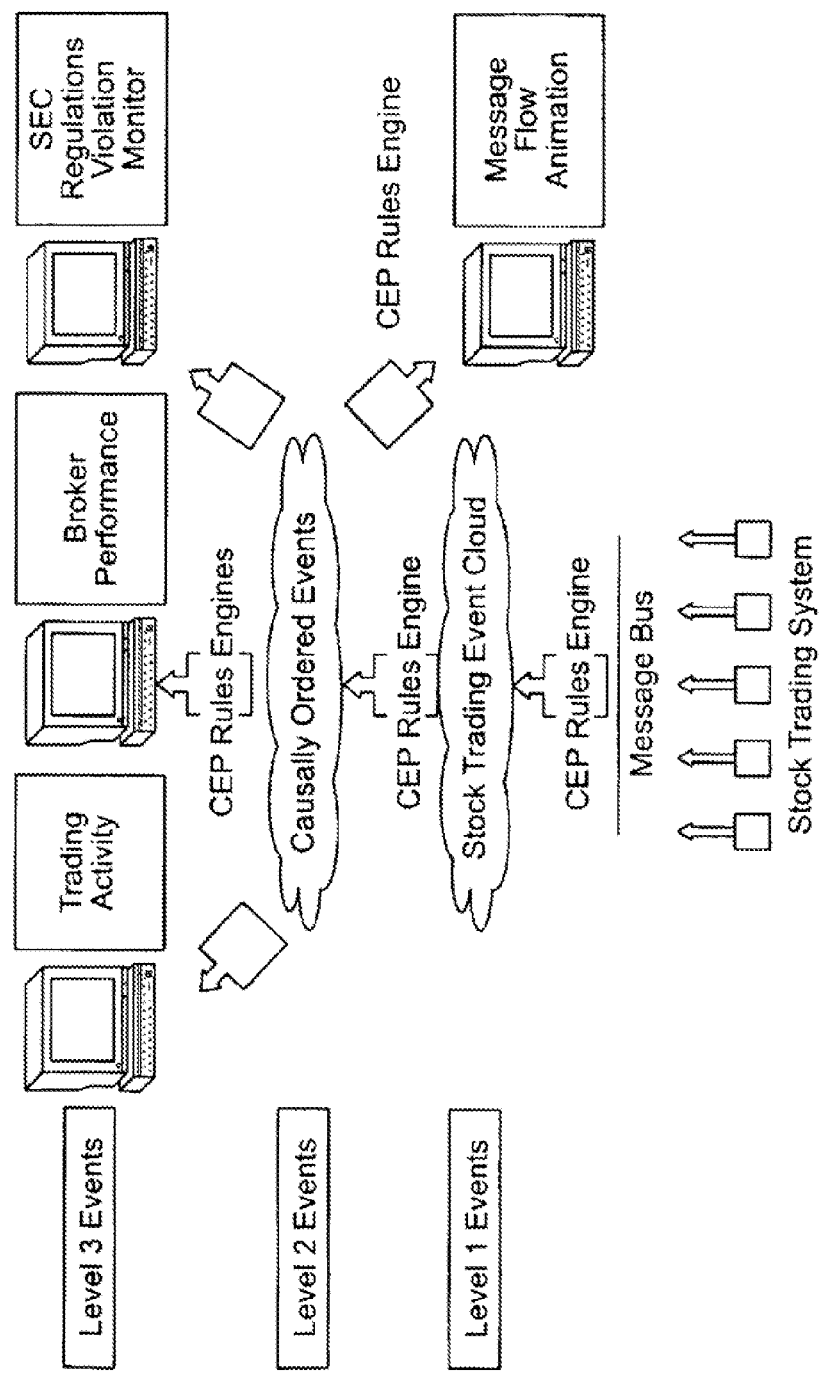
FIG. 8 illustrates an exemplary real-time application server product stack.

FIG. 8 illustrates an exemplary real-time application server product stack.

In one embodiment, there are essentially three layers:

Real-Time JAVA Runtime (RT-JVM): includes changes to the JAVA runtime needed to improve latency and determinism, and to allow better monitoring of real-time applications.

Real-time application server Infrastructure: the middleware infrastructure needed to support real-time event-driven applications. It can be made of two sub-layers:

Real-Time Core: I/O management, connection management, thread management, and other low-level services profiled for low-latency and determinism.

Event Driven Environment (EDE): event processing, stream management, and other services needed for event-driven applications.

Real-time application server Applications layer: the programming model for the development of real-time application server applications; this includes a real-time application server API, the real-time application server EPL, and a dependency injection container to assemble and configure the applications.

In summary, a real-time application server can be designed as a layered product. In one embodiment, there are currently three layers: RT-JVM, real-time application server infrastructure, and real-time application server programming model. A lower layer can be used without the upper layers. In another words, one may use the RT-JVM without the event-driven pieces, and still gain the services provided by the RT-JVM layer. Examples are legacy applications that do not want to change their code, or are not even event-driven, but do want the determinism provided by a deterministic garbage collector. Another scenario is applications that are event-driven, do need to process streaming events, but already have their own programming framework. In this case, the EDE can be used as an independent service. An example is a J2EE application, which wants to do event processing as part of a Session-Bean implementation.

Real-time application server modules can represent services. Services can improve re-use, and integrability.

A real-time application server can use an OSGi backplane as our pluggable service framework.

The OSGi backplane can provide infrastructure needed to support the pluggability of third-party components implementing our interfaces, such as third-party adapter's implementation for financial application protocols.

This can be achieved by:
1. A real-time application server makes available a set of framework interfaces (e.g. Adapter, AdapterFactory, Stream, StreamFactory, Processor, ProcessorFactory) as part of an interface-only bundle named EDE (event-driven environment).
2. Service providers register their implementations in the OSGi service registry using the real-time application server framework interfaces as service keys, and the following OSGi properties:
   VENDOR (e.g. BEA)
   TYPE (e.g. REGULAREXPRESSION, FIX, NEWSWARE)
3. Client applications request the appropriate service implementation from the OSGi registry filtering on the interface and on the previously mentioned OSGi properties.

In one embodiment, the real-time application server modules can also interface to other components solely by referencing registered OSGi services.

An adapter can have two main responsibilities: to marshal and un-marshal protocol specific messages, and to convert protocol specific data into the real-time application server normalized data model.

It is common to refer to the protocol specific part as the southbound side, and the normalization part as the northbound side of the adapter.

An adapter can define the entry-point into the real-time application server kernel, and as such is the first active object of the system. An active object can be a runnable entity, that is, it is supported by a Thread. This can be supported by providing an instance of an Executor service to all Adapter objects.

The most common type of adapters is socket-based adapters. A socket-based adapter contains an instance of an I/O multiplexer, also known as Reactor or Dispatcher. An I/O multiplexer allows a client object to asynchronously listen to file descriptors (i.e. TCP/IP ports) waiting for read and write data to become available. In addition to the I/O multiplexer, we would like to include a buffer chunking facility.

Adapters can be configured with protocol specific properties, and optionally with schema information on how to normalize the protocol specific data.

An adapter can be similar to a Service Handler in the Acceptor-Connector design pattern.

In summary, an adapter can provide the following functions:
    Delimit the entry point of a real-time application server application;
    Define the threading model (e.g. priority) of the invocation path;
    Normalize proprietary data model into the real-time application server's data model;

A real-time application server can provide a service provider interface (SPI) for the development of adapters. In addition, some common adapters can be provided, such as a basic socket adapter that normalizes CSV data.

The real-time application server need not provide an extensive adapter framework, such as it is the case of JCA nor provide different adapter implementations, for example for the different financial market protocols. These can be acquired by partnering with third-party vendors.

The real-time application server components (e.g. adapters, streams, EPAs, client POJOs) can communicate by sending and receiving events. This allows the modules to be decoupled of each other.

This mechanism can be implemented by using JAVA Bean Events. The JAVA Bean's event model is outlined as:
    Event notifications are propagated from sources to listeners by JAVA method invocations on the target listener objects.
    Each distinct kind of event notification is defined as a distinct JAVA method. These methods are then grouped in EventListener interfaces that inherit from JAVA.util.EventListener.

For a real-time application server, we can define a streaming Event Listener interface for receiving streaming events.
    Event listener classes identify themselves as interested in a particular set of events by implementing some set of EventListener interfaces.
    For a real-time application server, this means that adapters, streams, and EPAs can implement a streaming Event Listener interface. Client POJOs may also choose to implement it.
    The state associated with an event notification can normally encapsulate in an event state object that inherits from JAVA.util.EventObject and which is passed as the sole argument to the event method.

For a real-time application server, streaming Event Object class can be created. StreamingEventObject can be immutable and serializable. The latter is needed for streams that may want to store the events.
    Encapsulation of the event state need not be mandatory. If the event state object is already in the appropriate form of the real-time application server data model, then the event state object can be used directly.
    Event sources can identify themselves as sourcing particular events by defining registration methods that conform to a specific design pattern and accept references to instances of particular EventListener interfaces.
    For real-time application servers, adapters, streams, and EPAs can be event sources. Client POJOs may also be an event source.
    In circumstances where listeners cannot directly implement a particular interface, or when some additional behavior is required, an instance of a custom adaptor class may be interposed between a source and one or more listeners in order to establish the relationship or to augment behavior.
    A real-time application server can provide additional mechanisms so that Client POJOs do not need to implement the StreamingEventListener interface. For example, the Stream class can provide a callback annotation that can be used by client POJOs.

The advantages of using JAVA Bean Events for our purposes are:

A standard-based event infrastructure mechanism, which can be introspected by third-party tools;

Efficient call-and-return (synchronous) control flow;

One can break this synchronous control flow by adding the appropriate Stream implementation between the source and the listeners. This is further described in the following section.

When an event is triggered, the event source can call each eligible target listener. By default all currently registered listeners shall be considered eligible for notification. Event processor agents can filter the target listeners and only dispatch to a subset of listeners. This filtering can be specific to an event processing language. An EPL may state which named listener should receive the events.

Event listeners may throw application exceptions, which can be propagated to the event source. The event sources can catch the exceptions, log them to the logging system, but need not re-throw or propagate them onward. Hence an event listener exception need not impact the processing of other event listeners registered to the same event source.

Exceptions need not be propagated back to the external event generators. This is due to the asynchronous nature of event-driven applications, which completely decouples sources and sinks.

In most cases, it is expected that components can dispatch single events at a time. However, there are cases, for example when accessing a relational data source, where one may want to dispatch a bulk set of events. For this effect, an event iterator abstraction can be created. Event iterators can also be events, but can provide a way for the callee to handle a bulk set of events on its own pace.

The real-time application server can support features where distribution is needed.

One option for achieving this is to use JINI's Distributed Event model. JINI's distributed event model is an extension to JAVA Beans Events; hence it should be possible for us to migrate to JINI events if needed.

A data stream can be a continuous flow of data from a source to a destination.

In a real-time application server, streams can function as virtual pipes that connect event processor agents and event generators, and represent logical endpoints of the EPN.

Applications can attach to these endpoints both to send events, as well as to listen for events.

Several components can be wired to a single stream. In this case, the semantic can be that of a JMS topic, in the sense that all listeners receive all the events. Streams can function as a pass-through pipe, in which case their main value is to provide inbound and outbound abstract endpoints so that event sources and event listeners do not know of each other directly. Several components can be connected to a single stream endpoint.

Streams can also allow the breaking of the control flow. By default, event dispatching happens synchronously, however a stream can be configured to dispatch events to its listeners asynchronously, similarly to a producer-consumer blocking queue.

Streams may also provide the following services:

Persistent storage, through a write-behind (i.e. asynchronous) disk update

Event distribution across machine nodes to achieve high availability and better scalability.

Sequencing of out-of-order events and handling of other streaming event imperfections.

Processors can be responsible for executing rules specified by an event processing language (EPL). Therefore, a processor can contain a set of event processing rules.

A real-time application server can provide a framework for continuous query execution. This framework is agnostic to any particular language.

One of the problems that the framework addresses is that of decreasing the number of evaluations needed to find a match.

For example, consider the case of the following rule: "match for the sequence of event A followed by event B within 10 milliseconds". A naïve implementation may do the following evaluations for every arriving event: (1) if it is event A, then update state; (2) if its event B, then update state; (3) if the state shows that both events have arrived, then check if their time is within the stipulated interval. In this case, there are a total of three evaluations for every event.

An alternative approach would be: (1) if it is event A, then insert new expression 'if it is event B, then succeed', and trigger timer 'if current time after t1+100 milliseconds, remove second expression'. So, to begin with, there is only one evaluation for every event. After event A is received, the new expression '(2) if it is event B, then succeed' is inserted dynamically, hence when event B is received, there is a direct match of the rule (2), with no further evaluations needed. In this approach, only two rules are evaluated when the event B is matched, in contrast to three evaluations warranted in the previous case. When the timer expires, the expression 'if it is event B, then succeed' is removed and the system is back to a single evaluation per event.

The continuous query execution framework can be based upon the following concepts:

A set of standard physical query plan operators can be provided, and new operators can be plugged in. These operators can represent the usual Database Management System's (DBM's) physical operators, with the addition of concurrent query operators.

Operators can be classified for being tuple based, that is, they work off from individual tuples or data items, or full-relation based, they need a complete table or set of data items to operate. In addition, operators have different number of arguments (e.g. unary, binary).

Examples of tuple-based operators are: pattern match (i.e. filter), and generation (i.e. projection). Examples of time-based operators are: hash-join, time-window, and aggregation.

Generally, it should be possible to cache the results of the operators for the same input set of events. The exception is when the operators make use of context information.

Operators may keep state for their execution. For example, a hash-join operator may create an index of its input tables, and use the index to drive the joining. The operators' state is kept in structures called synopses. Synopses may be shared by different operators for optimization. For example, you may have two instances of the same hash-join operator, and they can share a single synopsis.

A directed graph, henceforth named the Query Execution Graph (QEG), can determine the operators to be executed, and their execution order, for the complete set of queries of an EPA. The operators can be associated to edges and represent the transition actions between the vertices of the QEG. A vertex can represent a state of the EPA, and can be named a state node. A QEG can have one start state node, and may have one or more end state nodes.

Operators can either be entry actions or transition actions of an edge. The action operators form an ordered chain of operators, where each operator output becomes the input of the next operator on the chain. An edge can have two chains of operators, one for the entry actions and another for the transition actions, the latter being optional. Any time an operator returns null, the execution of that chain can be terminated, and considered unsuccessful. For a QEG to transition from a state node to another state node, all the entry action operators of the connecting edge must execute successfully. If all entry action operators execute successfully, then the transition action operators can be executed.

Entry actions can be trigged by execution events taken from execution queues. Execution events can be pairs representing the application event, that is, the event tuple as specified in the Data Model section, and a mode flag, which is either 'insert' or 'remove'. The entry actions can specify the mode of the execution event they are interested on.

Generally, an execution queue is associated to each inbound stream, but this doesn't always need to be the case. For example, a simple pass-through execution queue can be used for scenarios that do not differentiate the source of the events, or for scenarios that do not include time constraints or other features that demand buffering.

This decision can be determined by the compiler.

The execution queues can be the event sources for a QEG, and drive the execution of the QEG. Inbound application events received from streams can be inserted into the connected execution queue; this can cause an execution event to be generated to the QEG, which contains the 'insert' flag, and wraps the actual application event.

Execution queues can optionally listen for heartbeat events from application clocks. The heartbeat events can be inserted into the execution queues. As the execution queues are filled up, remove execution events can be generated to the QEG. This heartbeat mechanism can be used to support time constraints. The periodicity of the heartbeats can be determined by the set of queries of the EPAs and is further detailed in a separate EPA specification.

The QEG can receive an event from an execution queue, and verify if there is an outgoing edge from its current state node whose entry actions execute successfully. If such an edge is found, then the event can be consumed, and the QEG moves to a new state node. If no edge is found from the current state node, then it can be the case that a new QEG instance needs to be started. This can be verified by performing this procedure on the start state node of the QEG. If it succeeds, then a new QEG instance can be created. Hence, although an EPA has a single QEG type, which is able to process all the EPL rules for that particular EPA, at one time an EPA may have zero or more QEG instances. As a QEG instance reaches its end state node, it can be terminated.

The benefits of the QEG can be:
A language-agnostic framework for specifying operators and their order of execution;
On its simplest form, a QEG can be a state machine. A state machine can be able to process all regular expression languages. Certain type of queries (e.g. pattern matching) can be regular expressions. Regular expressions can be closed under addition. This means that one can add all regular expression-based queries together, and the resulting expression is still a regular expression. Hence, one is able to have a single state machine, represented by a single QEG, capable of processing all the queries of an EPA in a shared highly optimized form.
As a simplistic example, consider the queries: (1) match all events for symbol 'ABC', (2) match all events for symbol 'ABD'. In this case, one can construct a QEG that systematically first matches 'AB', and then either 'C' or 'D'; and avoid the situation where first 'ABC' is processed, and if that fails, then 'ABD' is tried.

A QEG can be powerful enough to model computational rich languages (i.e. Turing complete languages), by allowing events to be put back into the execution queue, which can be compared in this case to a Turing machine tape.

An EPA can have a global context, represented by a map, which is accessible by the QEG instances of that EPA. This context can be populated by the real-time application server application developer, and can be used to provide external configurable data. This context can be shared across query execution in an EPA.

Figure 9:
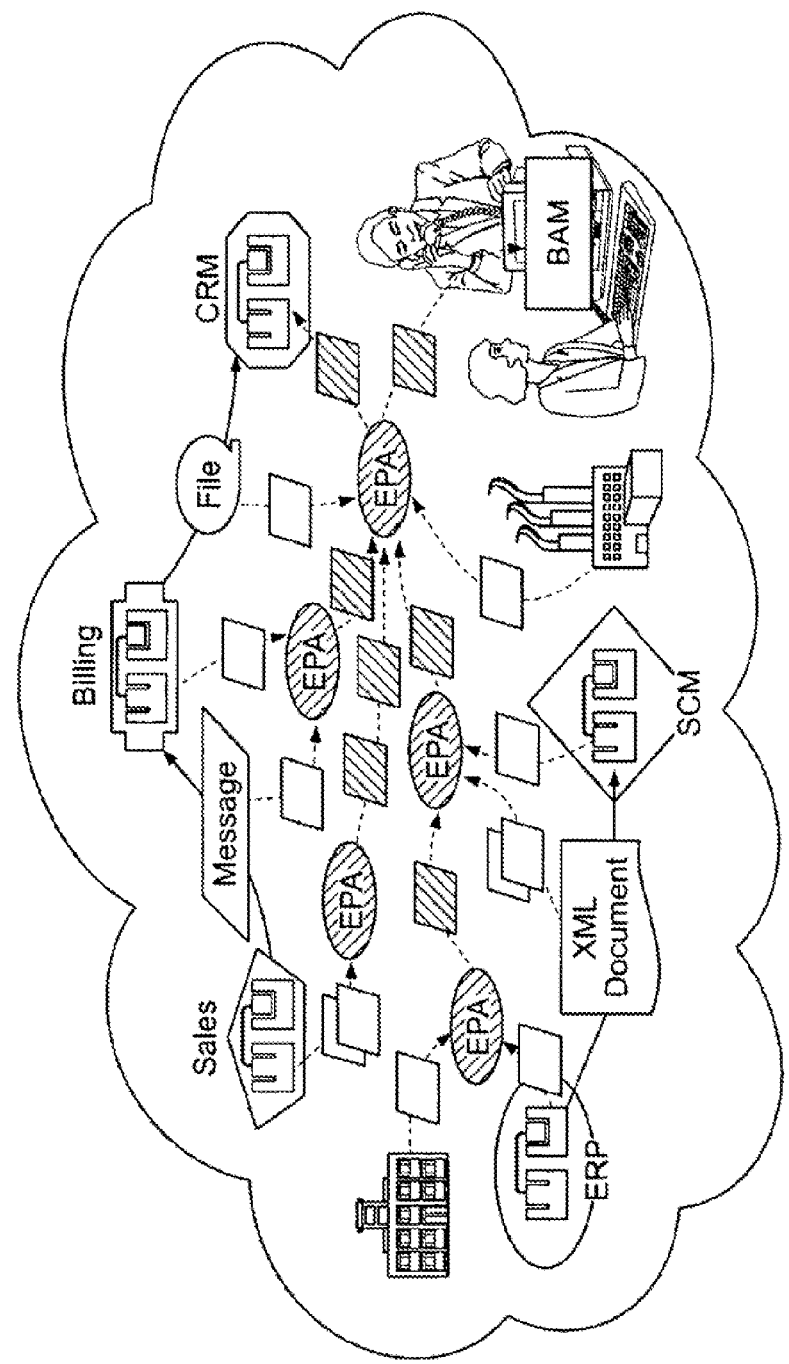
FIGS. 9 and 10 illustrate exemplary join scenarios.
Figure 10:
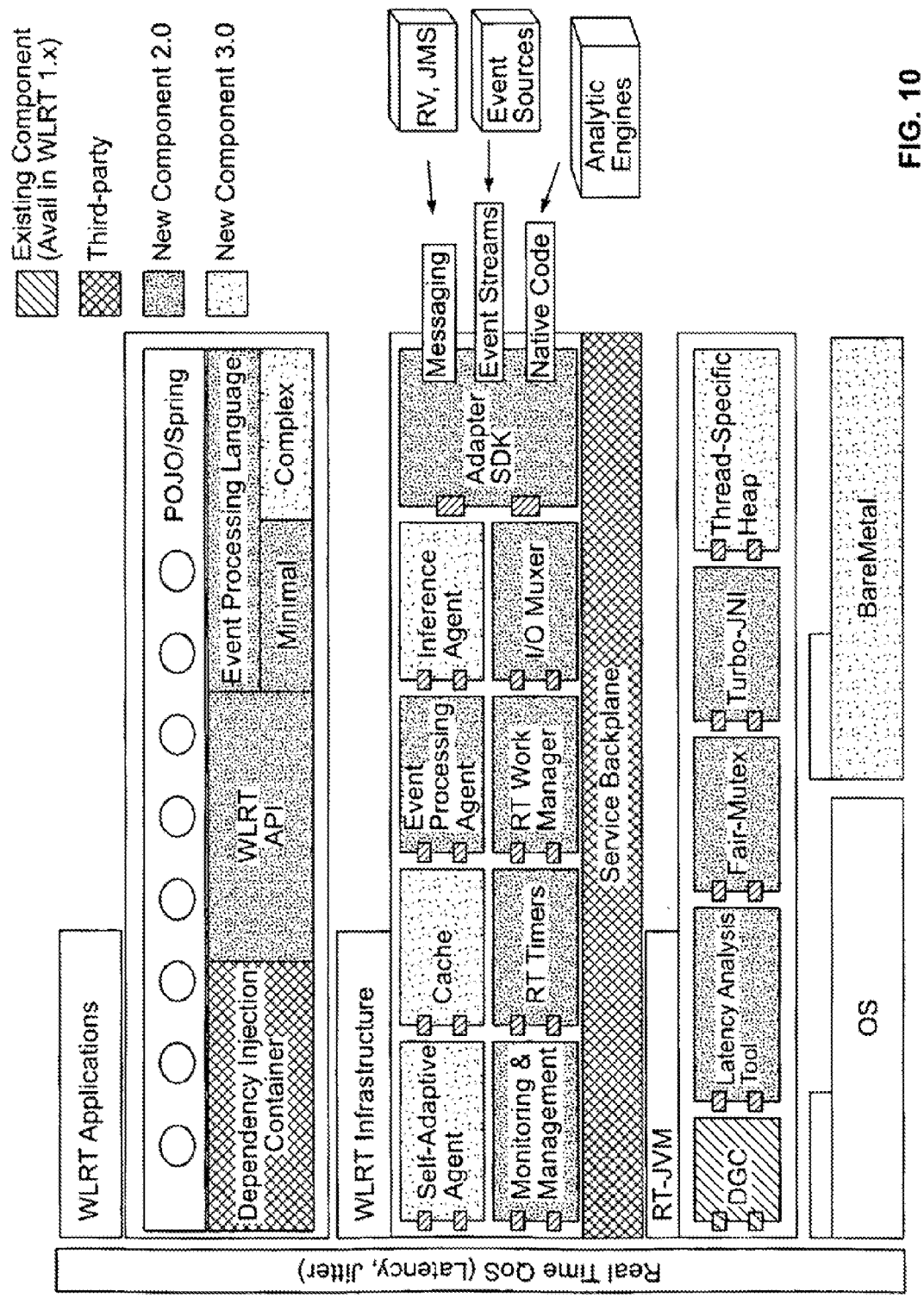

Consider the scenario where one wants to generate an alarm event if the same customer c is buying stocks from both BEA and IBM within a time window of n time. One possible QEG is described by the following state diagram of FIG. 9. One drawback of this approach is that a new QEG instance is created per customer. If it is expected that the number of customers is high, then a more suitable approach is to keep the customers organized in hash tables. This is illustrated by the diagram of FIG. 10. Compilers can generate physical query plans for a real-time application server, which are represented as query execution graphs and their association to processors.

Rules configured at an EPA can be specified by a single query execution graph associated to that same processor.

Compilers can construct query execution graphs in different forms. Compilers can generate the declarative assembly files that specify the execution graph, or compilers can generate JAVA code that directly builds the graph.

One of the main functions of the compiler is to optimize the query execution path. There are a number of heuristics that can be used for optimization:
The entry action operators can be ordered by their increasing estimated cost; one does not want to pass through a costly operator, just to fail on a cheap one afterwards.
Move filtering operations to be done as soon as possible; this is commonly known as selection pushing-down, and decreases the amount of data to be evaluated.
Try to share execution paths between queries as much as possible, this allows several queries to be evaluated by executing the minimal number of operators. The QEG should have few fan-outs as possible.

The EPL rules can reference to events. However these events can be created as JAVA objects by adapters, hence there can be a data model definition that is able to map the JAVA object events to a normalized event data model. This normalized view allows the EPL to reference events of different formats that have been generated by diverse external clients.

The data model for one embodiment of a real-time application server can define scalar types, and compound types.

The scalar types can be: Boolean, integer, long, float, and string. These are mapped directly to the corresponding JAVA native types.

The compound types are:
Tuple: an object that contains named properties. Properties have a name and a value. The name of a property is of string type, and the value may be of any type, including other tuple type. Tuples function similar to a dictionary, and allow for the usual insert (i.e. new name and value), remove, get and set operations.
Event (Tuple): event tuples are tuples that have the following predefined properties:
Name: string
Name defines the event type.

Id: long
All events have a unique Id in the context of an EPN, assigned at the time of the event creation.
Timestamp: long
Timestamp is the logical timestamp of the event. Timestamps are always on non-decreasing order.
Source: string (optional)
Source is the name of the source component that generated the event (e.g. the adapter name).
Caused by: long (optional)
Represents the event id of the causing event that led to the existence of this event.

Event tuples can be immutable. In one embodiment, they can only be populated at the time of their creation.

In JAVA, tuples (and event tuples) can be mapped to either JAVA Beans or maps.

Events can form hierarchies by having a parent event type. A child event type can be used in place of its parent, and must include all the properties of its parent, in addition to its own properties.

Events can also have aliases. Aliases can represent other names that an event may be specified by.

Events can be described by an event type metadata. An event type metadata can specify the event's properties, its aliases, its parent event type, and a mapping to a JAVA class.

Adapters, during the normalization phase, can create event tuples by converting the inbound source event. This conversion can be done by wrapping the source event in a real-time application server event tuple interface. This allows the normalization to be implemented simply as a delegation from the event tuple interface to the actual source event, and avoids unnecessary copies.

Another option for the normalization (or lack of it in this case) is to treat the event "as is". For example, if the source event is already in the form of a map or of a JAVA Bean, we could avoid the cost of wrapping it. In one embodiment, in the absence of an event wrapper; we can either use reflection at runtime, or generate JAVA code during the query compilation. The former is simpler to do, but has a higher runtime cost.

Many source events, e.g. TIBCO messages, market handler feed events; can be in map-like form already, hence the conversion to an event tuple can be straight full. There may be cases where the event sources are deeply nested, or object-based, in which a case a more elaborate conversion may be needed, for example by caching the nested values as needed.

A real-time application server can provide an event tuple utility service, with which the client can request for the creation of an event Id, or of the complete event tuple, passing along the parameters (e.g. name, source). Timestamps can be set as part of the event tuple creation, or originating from the source event.

The threading model for real-time application server applications can be mostly determined by the selection and configuration of an Executor at the adapter, that is, the entry point of the application.

Figure 11:
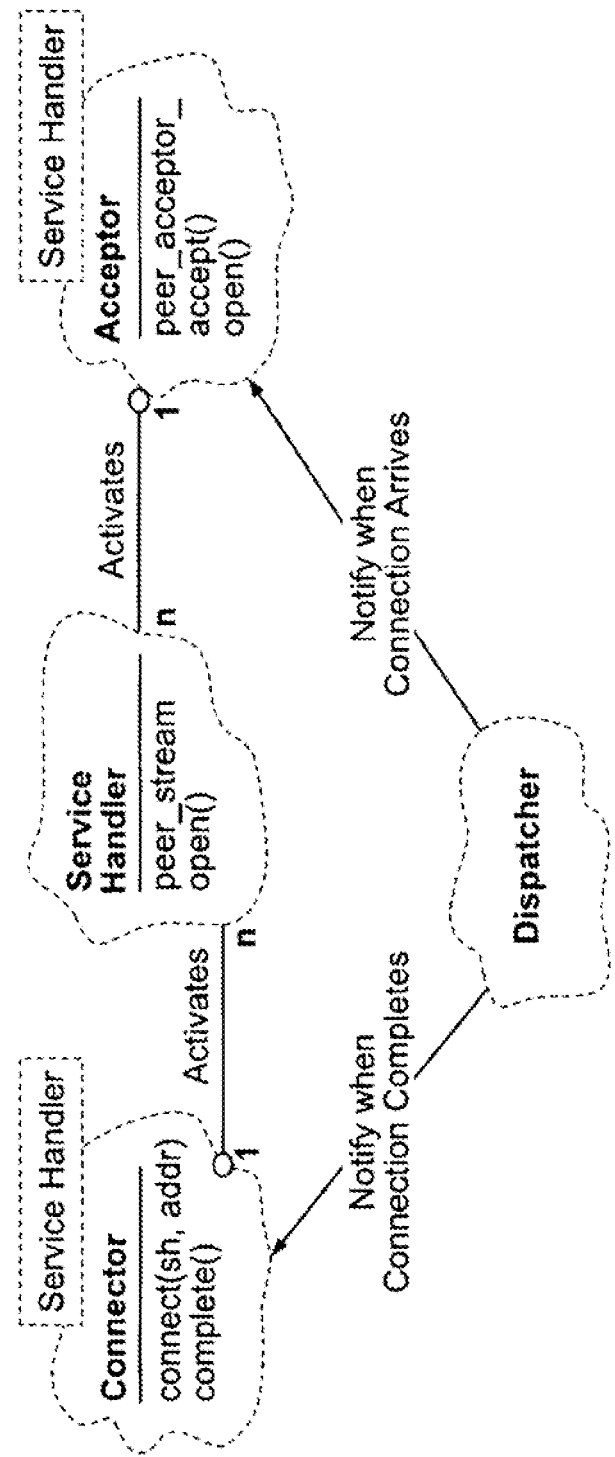
FIGS. 11 and 12 illustrate exemplary sequence diagrams.

Consider the sequence of FIG. 11. In this case, the stream is a simple pass-through. A thread is retrieved from the Executor pool, and is used to run the execution path to completion, starting at the adapter. The dispatch from the stream to the multiple listeners, i.e. EPA1 and EPA2, can happen synchronously in the context of this single thread.

All components, including the client POJO, should not hold the thread longer then it needs to, and take special care to realize asynchronous operations (e.g. write).

Figure 12:
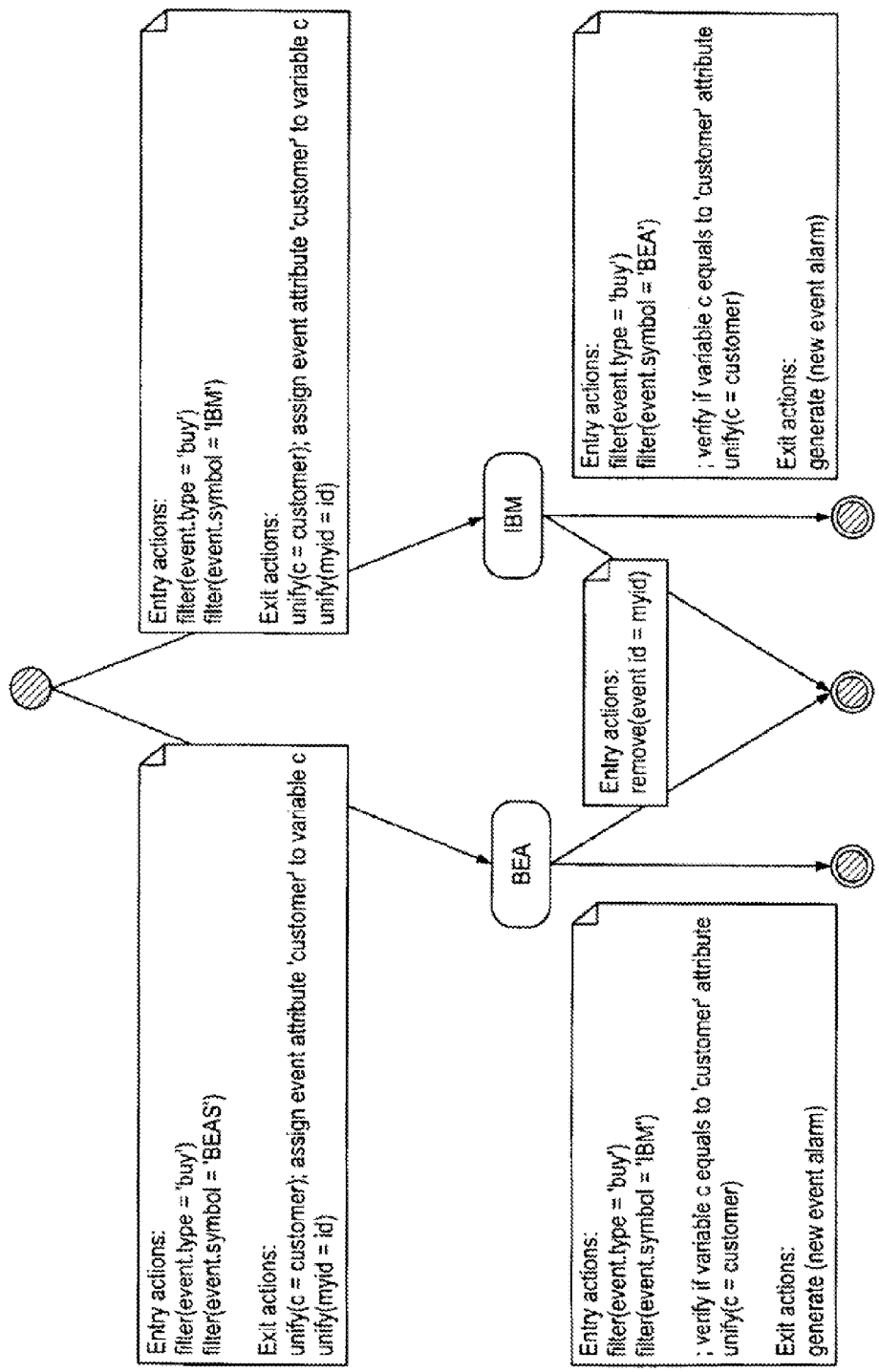
Figure 13:
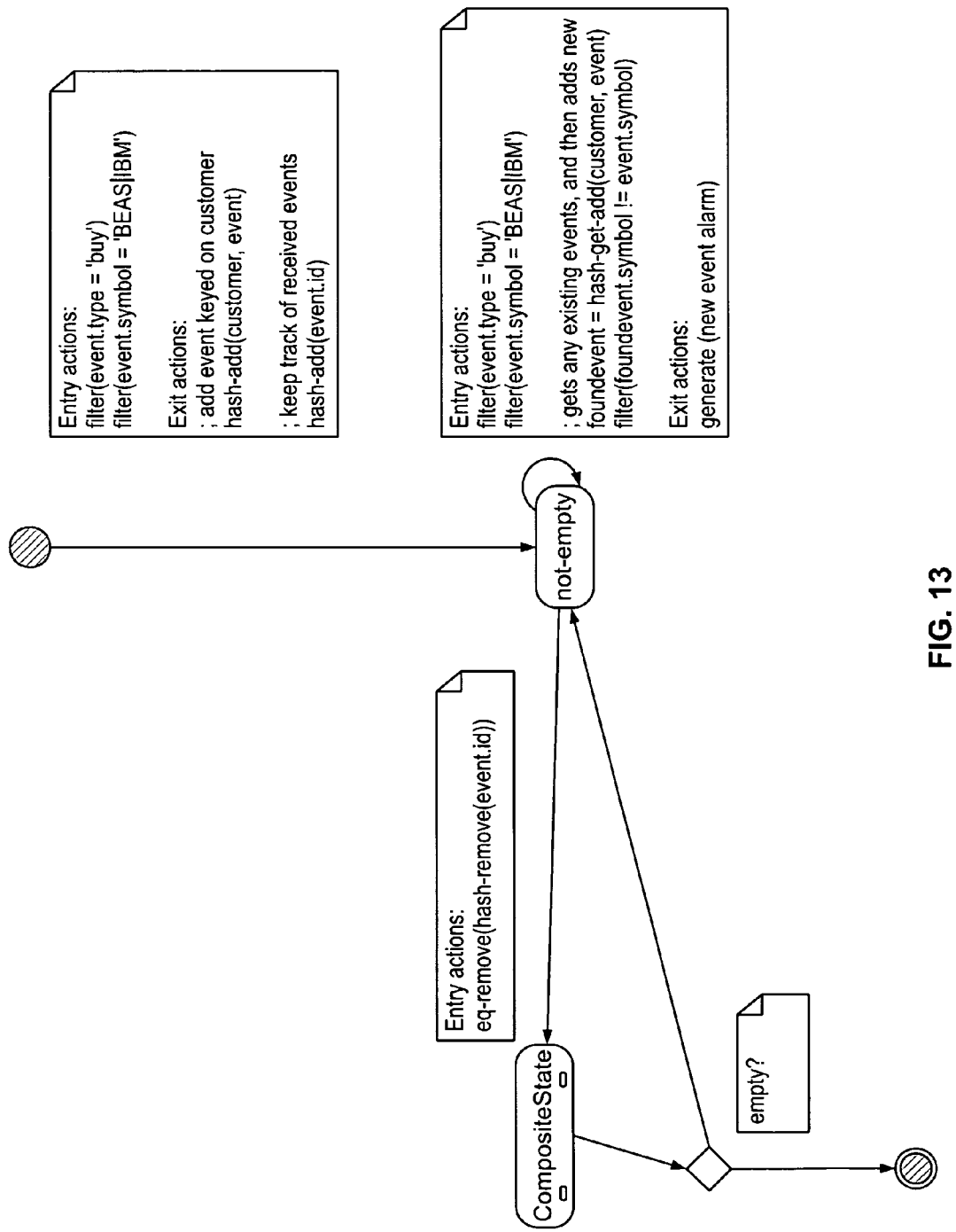
Figure 14:
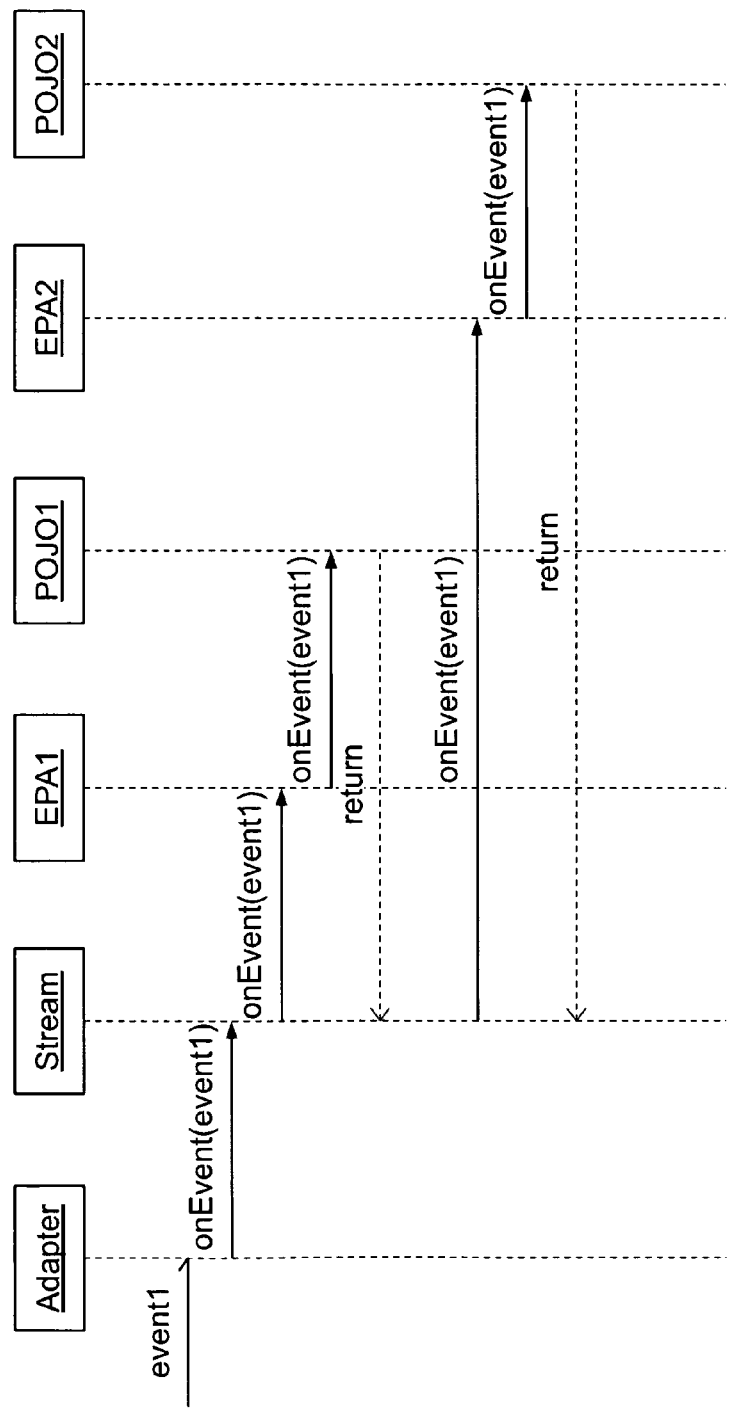
Figure 15:
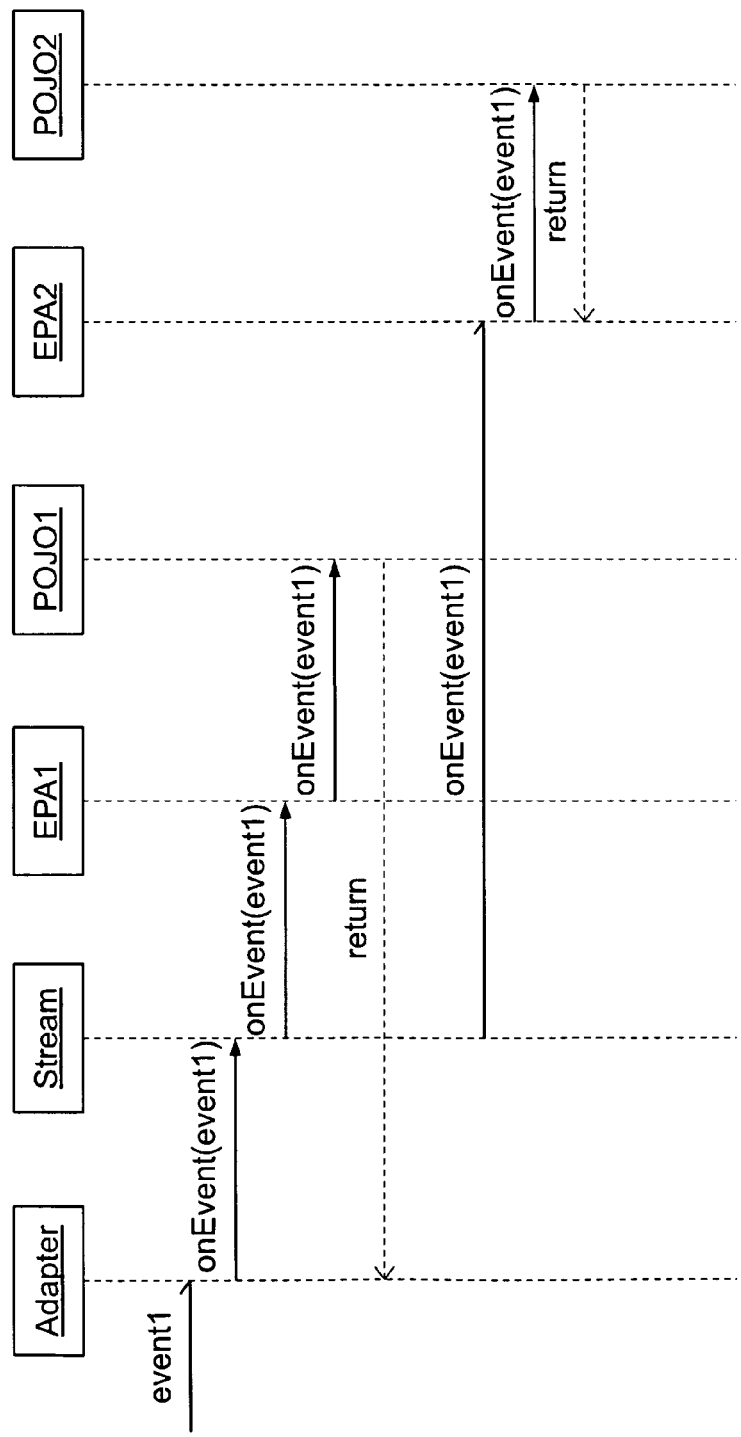

FIG. 12 shows an example where the stream is an asynchronous control flow stream.

When there are no fan-outs, that is, no component has more than one event listener, the initial thread can be used for the complete execution path, even up to the client POJO. When the path is finished, the thread is returned to the pool.

When there is a fan-out then one of the listeners can ride the caller thread, in this case EPA1, and for the remaining listeners, i.e. EPA2, a new thread can be requested from the pool by the event source and used for the dispatch to that listener. It may well be that the retrieved thread from the pool is the original caller thread that already has finished and returned to the pool, but in most cases it would be a new thread and a context switch would happen.

An executor may be configured to execute under certain priority. That is, one can assign a priority to the threads of the executor thread pool.

Executors can be assigned to adapters. A prioritized executor means that all events incoming through its assigned adapter can run using the specified priority of the executor.

This allows real-time application server applications to establish different priorities for the different execution paths of the EPN. This approach also allows the execution path to run from the start with the right priority, and hence is advantageous because changing thread priority can cause context switch.

During the execution of a client POJO, the developer has the opportunity to change the priority of the running thread, by using an interface. In doing so, the developer is essentially changing the priority of the remaining execution path. That is, the real-time application server infrastructure need not change back to the original thread priority after the thread returns from executing the client POJO. However, the real-time application server infrastructure can change back to the original thread priority of the parent executor when the thread is returned to its pool.

The execution path can always be started as a result of some asynchronous I/O trigger in an adapter.

This trigger mechanism may or may not be something that is under the control of the adapter implementation. For instance, in the case of TIBCO, one may not have access to their reactor, but rather just be called back when the TIBCO message is available.

When the trigger mechanism is available, the approach taken can be to, after the connection is established, use a thread from the executor of the adapter to wait for the availability of read data on the appropriate port (i.e. socket). When the data becomes available, the awaken thread can be the thread used to run the execution path as described previously. In another words, the 'reactor' thread can become the worker thread. However, by doing so, the port can become neglected as the waiting thread, called the leader thread, is now executing user code. Before taking away the leader thread, one should first assign another thread from the pool as the new leader thread to wait for more data on the port. This is known as the leader-follower design pattern. The advantage of this approach is that it avoids the context switch that generally happens when read data is handed off from the reactor thread to the worker thread.

One short-coming of this approach is if the execution path is long, and more read data becomes available than can be processed by the number of threads from the executor, the underlying I/O buffer may overflow. This problem can be solved by queuing the worker requests in the executor when the number of threads is exhausted. This can cause a context switch, and some locking, but allows us to support higher throughput.

Another short-coming of the lead-follower approach is that it tends to support a lesser number of connections. Although this is also resolve by the previous solution, we don't expect this to a problem, as it is anticipated that the number of clients per adapter need not be many.

This approach of using a queue between reactor and worker threads is the half-async/half-sync design pattern. Our approach can be hybrid design that is based upon the lead-follower approach when possible and fails back to the half-async/half-sync approach when needed.

In some sense, the real-time application server executor is self-tuning. The work manager for application servers can be self-tuning, it tune the number of threads of a thread-pool, trying to maximize throughput. A real-time application server with this feature means that a real-time application server developer does not have to worry about what is the best size of a real-time application server thread pool. The tuning can try to maximize latency in this case.

Finally, when the trigger mechanism is not under control of the adapter implementation, the developer can first understand what approach is taken by the vendor library. In one embodiment, if the vendor library is buffering the data and calling the adapter on a separate thread, the adapter should not again try to buffer the data and spawn new threads.

In this section we present the overall concepts for authoring real-time application server applications.

The typical real-time application server application development process can be:
  User creates project, possibly a new Eclipse JAVA project, representing an EPN.
  User configures class-path of the project to include exported packages from the needed bundles (e.g. edk). User also needs to include any used libraries, such as SPRING-framework.jar.
  User includes JAVA classes that contain the application specific code, usually in the form of POJOs.
  User creates one or more Event Processing Language (EPL) files, each representing a separate Event Processing Application (EPA). For example, one could create a 'Trader.epl' file, which would contain the EPL rules for an EPA named 'Trader'.
  EPAs can be scoped to an EPN, so one cannot have more than one EPA file with the same name within the same project.
  The rules within an EPA may reference to streams. Any referenced stream can force the logical existence of that stream within that EPN. By default, all EPAs can have two native streams, the IN stream and the OUT stream. These can be named by prefixing IN and OUT with the EPA name.
  For example, consider the following rule:
Stream1.StockQuote("BEA", price>12.00)→Stream2.Alarm( )
  This rule implicitly creates streams Stream1 and Stream2, if these streams have not been created yet.
  Now consider the rule:
    StockQuote ("BEA", price>12.00)→Alarm( )
  This rule can implicitly create streams Trader_IN and Trader_OUT
  Streams can be scoped to an EPN. This allows different EPAs within the same EPN to reference to the same streams.
  Assembling the application can be the process of specifying, programmatically or declaratively, the components of the system, that is, of the EPN and wiring them together as needed for their interaction.
  The first step can consist of defining what the components of the EPN are. As previously stated, the EPN component types can be: adapters, streams, EPAs, and user POJOs. One may deduce the EPA and stream instances of the EPN by inspecting the EPL files present in the project, hence there is no need to explicitly create EPA and stream instances; this can be done by the runtime framework. In one embodiment, the user does have to create instances for adapters and user POJOs, and have to wire all of the instances together.

In one embodiment, to create adapter instances, the user can have the following options:
  Programmatically retrieve the registered OSGi Adapter service
  Declare a SPRING-bean representing the OSGi Adapter service, through the SPRING-OSGi integration.
  User POJO instances can be created in whatever way the user chooses to. In many cases, the user can choose to do so through SPRING, by declaring a SPRING bean. Another option is to declare the POJO as an OSGi service and then instantiate it using OSGi's APIs. This can be a less favorable approach, as in most cases a POJO application is not a logical OSGi service.

Having created the component instances of the EPN, these instances can be wired together. This can be done by registering component instances as event listeners of component instances that are event sources, or vice-versa. Streams and EPAs can already be wired to each others by the EPA rules; hence the user only has to wire the adapters and POJOs to the desired streams. For example, the user can specify that an inbound stream of an EPA is wired to an adapter, and the outbound stream of an EPA is wired to a user POJO. The concept of stream can allow the EPA rules to be decoupled from the actual implementation component that is responsible for handling the events.

Specifically, the wiring of event sources and event listeners can be done using the following options:
  The Standard JAVA Bean Event interfaces
  Declaratively using dependency injection
  For the latter option, any dependency injection container can do, currently there are two options:
  Core Engine's Simple Configuration Provider services
  SPRING framework
  Finally, after the assembly of the instances, one can configure the instances.
  Configuration can be specific to a component type.
  Adapters can be configured with an instance of a real-time application server Executor.
  Socket-based Adapters can also be configured with an instance of an I/O Multiplexer, whose configuration includes a TCP/IP port.
  The configuration of user POJOs can be application specific.
  Similarly to the assembly of the real-time application server application, the configuration of the component instances can be done programmatically using standard JAVA Bean interfaces, or declaratively using dependency injection.

In summary, the assembly and configuration of a real-time application server application can be open. The user can be able to programmatically or declaratively access all infrastructure component instances (e.g. adapter, stream, EPA, executors) through standard mechanisms. In one embodiment, this almost container-less environment provides a lot of flexibility; the user can integrate with other technologies, and even annotate the call path, for instance, using AOP.

There need be no object management by the infrastructure; the infrastructure can use the registered component instances as it is. For example, the same user POJO instance can be registered as an event listener can be trigged for all events. Hence, if POJO instance contains state, it can be protected (e.g. synchronized) by the user.

Another approach is to consider the user POJO as an OSGi service. In this case, a user POJO service instance can be retrieved using an event attribute as the OSGi service key to the user POJO service. This can be done per event, and can be cached as needed.

All JAVA files can be compiled into JAVA classes, and the EPL files can be compiled into executable artifacts.

All of these artifacts, that is the compiled and the configuration artifacts, can to be packaged as an OSGi bundle and placed into an OSGi modules directory. The real-time application server application is an OSGi module, which uses real-time application server modules (e.g. EDK).

For that matter, in one embodiment, the OSGi configuration files (e.g. MANIFEST.MF) can need to be configured by the user.

To run the application, the OSGi start script, which points to the OSGi modules directory, can be executed.

The real-time application server can be packaged into separate OSGi bundles to allow for extensibility. A main module can be provided with the real-time application server framework, which includes all the interfaces and some basic supporting classes. Separate modules can be provided for the out-of-the-box implementation of adapters, streams, and EPAs.

An Event Processing Language (EPL) can be used for an event server, such as WebLogic Event Server 2.0. The language can allow event data from streams and external JDBC sources to be declaratively filtered, correlated, aggregated, and merged, with the ability to insert results to other streams for further downstream processing. The language can have additional functionality over SQL type languages to both a) constraint the amount of data over which the query is run since unlike relatively static relational table data, the stream data is continuously flowing, and b) detect a series of events that match a specified pattern.

In one embodiment, the Complex Event Processor module can be broken down into the following functional components: event representation, processing model, programmatic interface, and language specification.

Events can be represented as Plain Old JAVA Objects (POJOs) following the JAVA Beans conventions. Event properties can be exposed through getter methods on the POJO. When possible, the results from EPL statement execution can also returned as POJOs. However, there are times when un-typed events are returned such as when event streams are joined. In this case, an instance of the Map collection interface can be returned.

The EPL processing model can be continuous: results can be output as soon as incoming events are received that meet the constraints of the statement. In one embodiment, two types of events can be generated during output: insert events for new events entering the output window and remove events for old events exiting the output window. Listeners may be attached and notified when either or both type of events occur.

In one embodiment, incoming events may be processed through either sliding or batched windows. Sliding windows can process events by gradually moving the window over the data in single increments, while batched windows can process events by moving the window over data in discrete chunks. The window size may be defined by the maximum number of events contained or by the maximum amount of time to keep an event.

The EPL programmatic interfaces can allow statements to be individually compiled or loaded in bulk through a URL. Statements may be iterated over, retrieved, started and stopped. Listeners may be attached to statements and notified when either insert and/or remove events occur.

The Event Processing Language (EPL), can be a SQL-like language with SELECT, FROM, WHERE, GROUP BY, HAVING and ORDER BY clauses. Streams replace tables as the source of data with events replacing rows as the basic unit of data. Since events are composed of data, the SQL concepts of correlation through joins, filtering through sub-queries, and aggregation through grouping may be effectively leveraged. The INSERT INTO clause can be recast as a means of forwarding events to other streams for further downstream processing. External data accessible through JDBC may be queried and joined with the stream data. Additional clauses such as the RETAIN, MATCHING, and OUTPUT clauses can also be available to provide language constructs specific to event processing.

The RETAIN clause can constrain the amount of data over which the query is run, essentially defining a virtual window over the stream data. Unlike relational database systems in which tables bound the extents of the data, event processing systems can use alternative, more dynamic means of limiting the queried data.

The MATCHING clause can detect sequences of events matching a specific pattern. Temporal and logical operators such as AND, OR, and FOLLOWED BY can enable both occurrence of and absence of events to be detected through arbitrarily complex expressions.

The OUTPUT clause can throttle results of statement execution to prevent overloading downstream processors. Either all or a subset of the first or last resulting events can be passed on in either time or row-based batches.

An event can be an immutable record of a past occurrence of an action or state change. In this example, event is represented by the com.bean.wlrt.ede.StreamingEvent interface. In this example, an event can have an underlying object that represents the event object which is accessible through the StreamingEvent.getUnderlying( ) method. In one embodiment, the underlying object can have a set of event properties that supply information about the event and may be represented as any of the following:

| JAVA Class | Description |
| --- | --- |
| JAVA.lang.Object | Any JAVA POJO with getter methods following JAVA Beans conventions. |
| JAVA.util.Map | Map events are key-values pairs |

Plain old JAVA object (POJO) events can be object instances that expose event properties through JAVA Beans-style getter methods. Events classes or interfaces do not have to be fully compliant to the JAVA Beans specification; however for the EPL engine to obtain event properties, in one embodiment, the required JAVA Beans getter methods must be present.

EPL can support JAVA Beans-style event classes that extend a super class or implement one or more interfaces. Also, EPL statements can refer to JAVA interface classes and abstract classes.

Classes that represent events can be made immutable. As events are recordings of a state change or action that occurred in the past, the relevant event properties need not be changeable. However this is not a hard requirement and the EPL engine can accept events that are mutable as well.

Events can also be represented by objects that implement the JAVA.util.Map interface. Event properties of Map events can be the values of each entry accessible through the get method exposed by the JAVA.util.Map interface.

Entries in the Map can represent event properties. Keys can be of the type JAVA.util.String for the engine to be able to look up event property names specified by EPL statements. Values can be of any type. POJOs may also appear as values in a Map.

The engine can also query JAVA objects as values in a Map event via the nested property syntax. Thus Map events can be used to aggregate multiple data structures into a single event and query the composite information in a convenient way. The example below demonstrates a Map event with a transaction and an account object.

Map event=new HashMap( );
event.put("txn", txn);
event.put("account", account);
events.add(new StreamingEventObject(TxnEventType, 0, 0, event));

An example statement could look as follows.
SELECT account.id, account.rate*txn.amount
FROM TxnEvent RETAIN 60 SECONDS
GROUP BY account.id EPL expressions can include simple as well as indexed, mapped and nested event properties. The table below outlines the different exemplary types of properties and their syntax in an event expression. This syntax allows statements to query deep JAVABeans objects graphs, XML structures and Map events. The following describes types of one embodiments:

Simple event properties can require a getter-method that returns the property value. In this example, the getFirstName getter method returns the firstName event property of type String.

Indexed event properties can require either one of the following getter-methods:
  A method that takes an integer type key value and returns the property value, such as the getSubordinate method.
  A method that returns an array-type such as the getSubordinates getter method, which returns an array of Employee.

In an EPL statement, indexed properties can be accessed via the property [index] syntax.

Mapped event properties can require a getter-method that takes a String type key value and returns a property value, such as the getAddress method. In an EPL or event pattern statement, mapped properties can be accessed via the property('key') syntax.

Nested event properties can require a getter-method that returns the nesting object. The getAddress and getSubordinate methods can be mapped and indexed properties that return a nesting object. In an EPL statement, nested properties can be accessed via the property.nestedProperty syntax.

| Type | Description | Syntax | Example |
|---|---|---|---|
| Simple | A property that has a single value that may be retrieved. The property type may be a primitive type (such as int, or JAVA.lang.String) or another complex type. | name | sensorID |
| Nested | A nested property is a property that Lives within another property of an event. Note that events represented as a Map may only nest other POJO events and not other Map events. | name.nestedname | sensor.value |
| Indexed | An indexed property stores an ordered collection of objects (all of the same type) that can be individually accessed by an integer valued, non-negative index (or subscript). Note that events represented as a Map do not support Indexed properties. | name[index] | sensor[0] |
| Mapped | A mapped property stores a keyed collection of objects (all of the same type). As an extension to standard JAVA Beans APIs, EPL considers any property that accepts a String-valued key a mapped property. Note that events represented as a Map do not support Indexed properties | name('key') | sensor('light') |

Assume there is an EmployeeEvent class as shown below. The mapped and indexed properties in this example can return JAVA objects but could also return JAVA language primitive types (such as int or String). The Address object and Employee objects can themselves have properties that are nested within them, such as a street-Name in the Address object or a name of the employee in the Employee object.

```
public class EmployeeEvent {
  public String getFirstName( );
  public Address getAddress(String type);
  public Employee getSubordinate(int index);
  public Employee[ ] getAllSubordinates( );
}
```

EPL statements can allow the use of indexed, mapped and nested properties (or a combination of these) at any place where one or more event property names are expected. The example below shows different combinations of indexed, mapped and nested properties.

address('home').streetName
subordinate[0].name='anotherName'
allSubordinates[1].name
subordinate[0].address('home').streetName Similarly, the syntax can be used in EPL statements in all places where an event property name is expected, such as in select lists, where clauses or join criteria.

```
SELECT firstName, address('work'), subordinate[0].name,
    subordinate[1].name
FROM EmployeeEvent RETAIN ALL
WHERE address('work').streetName = 'Park Ave'
```

Event listeners can provide a means of receiving programmatic notifications when events occur that meet the criteria specified in an EPL statement. In one embodiment, listeners may be notified when either:

New events occur which meet the criteria specified in an EPL statement. These are termed ISTREAM events.

Old events that previously met the criteria specified in an EPL statement are pushed out of the output window due to their expiration or due to new incoming events occurring that take their place. These are termed RSTREAM events.

Detailed examples illustrating when each of these notifications occur are provided below.

In one embodiment, to receive ISTREAM events the com.bea.wlrt.ede.StreamingEventListener interface is used. Implementations can provide a single onevent method that the engine invokes when results become available. With this interface, only the new events are sent to the listener.

```
public interface StreamingEventListener extends EventListener {
    void onEvent(List<StreamingEvent> newEvents)
    throws RejectStreamingEventException;.
    /**
     * Listeners that do not want to implement the Listener interface
     * can annotate an existing method to notify runtime which method
     * to call back when events arrive.
     *
     */
    @Target(ElementType.METHOD)
    @Retention(RetentionPolicy.RUNTIME)
    @interface Callback {
    }
}
```

To receive both ISTREAM and RSTREAM events the com.bea.wlrt.ede.RStreamingEventListener interface can be used. Since this interface is derived from the StreamingEventListener interface, implementations must provide both an onevent method as well as an onREvent method. The engine can invoke the onevent as before while the onREvent method is invoked when either ISTREAM or RSTREAM events occur. With the onREvent method, both the new and old events can be sent to the listener.

```
public interface RStreamingEventListener extends
StreamingEventListener {
    void onREvent(List<StreamingEvent> newEvents,
    List<StreamingEvent>oldEvents)
        throws RejectStreamingEventException;
    /**
     * Listeners that do not want to implement the Listener interface
     * can annotate an existing method to notify runtime which method
     * to call back when events arrive.
     *
     */
    @Target(ElementType.METHOD)
    @Retention(RetentionPolicy.RUNTIME)
        @interface Callback {
    }
}
```

In one embodiment, the engine can provide statement results to listeners by placing results in com.bea.wlrt.ede.StreamingEvent instances. A typical listener implementation can query the StreamingEvent instances via getter methods to obtain the statement-generated results.

The get method on the StreamingEvent interface can be used to retrieve result columns by name. The property name supplied to the get method can also be used to query nested, indexed or array properties of object graphs.

The getUnderlying method on the StreamingEvent interface can allow update listeners to obtain the underlying event object. For wildcard selects, the underlying event is the original event object that was sent into the engine. For joins and select clauses with expressions, the underlying object implements JAVA.util.Map.

The top-level extended Backus-Naur form (eBNF) for EPL can be as follows:
[INSERT INTO insert_into_def]
SELECT select_list
FROM stream_source_list
[MATCHING pattern_expression]
[WHERE search_conditions]
[GROUP BY grouping_expression_list]
[HAVING grouping_search_conditions]
[ORDER BY order_by_expression_list]
[OUTPUT output_specification]

Embodiments of the present invention can include computer-based methods and systems which may be implemented using conventional general purpose or a specialized digital computer(s) or microprocessor(s), programmed according to the teachings of the present disclosure. Appropriate software coding can readily be prepared by programmers based on the teachings of the present disclosure.

Embodiments of the present invention can include a computer readable medium, such as computer readable storage medium. The computer readable storage medium can have stored instructions which can be used to program a computer to perform any of the features present herein. The storage medium can include, but is not limited to, any type of disk including floppy disks, optical discs, DVD, CD-ROMs, micro drive, and magneto-optical disks, ROMs, RAMs, EPROMs, EEPROMs, DRAMs, flash memory or any media or device suitable for storing instructions and/or data. The present invention can include software for controlling both the hardware of a computer, such as general purpose/specialized computer(s) or microprocessor(s), and for enabling them to interact with a human user or other mechanism utilizing the results of the present invention. Such software may include, but is not limited to, device drivers, operating systems, execution environments/containers, and user applications.

Embodiments of the present invention can include providing code for implementing processes of the present invention. The providing can include providing code to a user in any manner. For example, the providing can include transmitting digital signals containing the code to a user; providing the code on a physical media to a user; or any other method of making the code available.

Embodiments of the present invention can include a computer-implemented method for transmitting the code which can be executed at a computer to perform any of the processes of embodiments of the present invention. The transmitting can include transfer through any portion of a network, such as the Internet; through wires, the atmosphere or space; or any other type of transmission. The transmitting can include initiating a transmission of code; or causing the code to pass into any region or country from another region or country. A transmission to a user can include any transmission received by the user in any region or country, regardless of the location from which the transmission is sent.

Embodiments of the present invention can include a signal containing code which can be executed at a computer to perform any of the processes of embodiments of the present invention. The signal can be transmitted through a network, such as the Internet; through wires, the atmosphere or space; or any other type of transmission. The entire signal need not be in transit at the same time. The signal can extend in time over the period of its transfer. The signal is not to be considered as a snapshot of what is currently in transit.

The forgoing description of preferred embodiments of the present invention has been provided for the purposes of illustration and description. It is not intended to be exhaustive or to limit the invention to the precise forms disclosed. Many modifications and variations can be apparent to one of ordinary skill in the relevant arts. For example, steps preformed in the embodiments of the invention disclosed can be performed in alternate orders, certain steps can be omitted, and additional steps can be added. The embodiments were chosen and described in order to best explain the principles of the invention and its practical application, thereby enabling others skilled in the art to understand the invention for various embodiments and with various modifications that are suited to the particular used contemplated. It is intended that the scope of the invention be defined by the claims and their equivalents.

The invention claimed is:

1. A system for implementing an event processing network, comprising:
   a computer which includes a microprocessor;
   an event server which executes on the computer and runs an event driven application that implements an event processing network (EPN), including one or more services, wherein the EPN is defined by an EPN assembly file that indicates a plurality of event sources, event sinks, event processors, and stream components, which are used to process events as part of the event driven application, and wherein
      each event processor is associated with its own configuration file, written in a markup language, and user-defined event processing and temporal constraint rules,
      the structure of each configuration file is defined by one or more schema documents, which define common elements that are shared with other configuration files and elements that are specific to the enclosing configuration file,
      the configuration file contains a top-level root element which in turn contains one or more sub-elements,
      each of the sub-elements contains a set of configuration data for the event processor,
      each stream functions as a virtual channel connecting one or more event sources, event sinks and event processors, and
      each event processor executes its user-defined processing rules against one or more streams;
   a plurality of adapters, each of which provides an interface that enables incoming data to be received at the event server and converted into event types that the event driven application understands;
   wherein the EPN as defined by its assembly file further includes that at least two of the event processors should operate concurrently to operate on one or more input streams; and
   wherein upon receiving the incoming data from the one or more input streams via the event sources, the event server controls the flow of events so that the events are processed concurrently, including duplicating events as appropriate for concurrent processing by each event processor.

2. The system of claim 1, wherein the configuration includes that multiple event processors should work concurrently.

3. The system of claim 2, wherein the same event is processed concurrently by different ones of the multiple event processors.

4. The system of claim 2, wherein different events are processed concurrently by different ones of the multiple event processors.

5. The system of claim 1, wherein the configuration includes that an event sink should wait for the flow of events from the multiple event processors to join back into a single flow, and wherein the event sink is then enabled to start handling events only when both processors fire the same event to the stream feeding the event sink.

6. The system of claim 1, wherein the event driven application and its event processing network is specified by XML.

7. The system of claim 6, wherein the XML is an extension of the SPRING framework XML.

8. The system of claim 7, wherein the event processing network XML allows for the use of SPRING beans.

9. The system of claim 1, wherein the processor uses rules written in an event processing language.

10. The system of claim 1, wherein the event driven application is bundled in to a JAR file to be provided to an event server.

11. The system of claim 1, wherein priority for different parts of the event processing network can be set by a user, the priority determining what part of the event processing network has priority of event processing in case of the events exceeding the capacity of the event server.

12. A non-transitory computer readable storage medium, including instructions stored thereon, which when read and executed by one or more computers, cause the one or more computers to perform the steps comprising:
   providing an event server which executes on the computer and runs an event driven application that implements an event processing network (EPN), including one or more services, wherein the EPN is defined by an EPN assembly file that indicates a plurality of event sources, event sinks, event processors and stream components, which are used to process events as part of the event driven application, and wherein
      each event processor is associated with its own configuration file, written in a markup language, and user-defined event processing and temporal constraint rules,
      the structure of each configuration file is defined by one or more schema documents, which define common elements that are shared with other configuration files and elements that are specific to the enclosing configuration file,
      the configuration file contains a top-level root element which in turn contains one or more sub-elements,
      each of the sub-elements contains a set of configuration data for the event processor,
      each stream functions as a virtual channel connecting one or more event sources, event sinks and event processors, and
      each event processor executes its user-defined processing rules against one or more streams;
   providing a plurality of adapters, each of which provides an interface that enables incoming data to be received at the event server and converted into event types that the event driven application understands;

wherein the EPN as defined by its assembly file further includes further includes that at least two of the event processors should operate concurrently to operate on one or more input streams; and wherein upon receiving the incoming data from the one or more input streams via the event sources, the event server controls the flow of events so that the events are processed concurrently, including duplicating events as appropriate for concurrent processing by each event processor.

13. The computer readable storage medium of claim 12, wherein the configuration includes that multiple event processors should work concurrently.

14. The computer readable storage medium of claim 13, wherein the same event is processed concurrently by different ones of the multiple event processors.

15. The computer readable storage medium of claim 13, wherein different events are processed concurrently by different ones of the multiple event processors.

16. The computer readable storage medium of claim 12, wherein the configuration includes that an event sink should wait for the flow of events from the multiple event processors to join back into a single flow, and wherein the event sink is then enabled to start handling events only when both processors fire the same event to the stream feeding the event sink.

17. The computer readable storage medium of claim 12, wherein the event driven application and its event processing network is specified by XML.

18. The computer readable storage medium of claim 17, wherein the XML is an extension of SPRING framework XML.

19. The computer readable storage medium of claim 18, wherein the event processing network XML allows for the use of SPRING beans.

20. The computer readable storage medium of claim 12, wherein the processor uses rules written in an event processing language.

21. The computer readable storage medium of claim 12, wherein the event driven application is bundled in to a JAR file to be provided to an event server.

22. The computer readable storage medium of claim 12, wherein priority for different parts of the event processing network can be set by a user, the priority determining which part of the event processing network has priority of event processing in case of the events exceeding the capacity of the event server.

23. A method of implementing an event processing network, comprising:
  providing an event server which executes on a computer and runs an event driven application that implements an event processing network (EPN), including one or more services, wherein the EPN is defined by an EPN assembly file that indicates a plurality of event sources, event sinks, event processors and stream components, which are used to process events as part of the event driven application, and wherein
    each event processor is associated with its own configuration file, written in a markup language, and user-defined event processing and temporal constraint rules,
    the structure of each configuration file is defined by one or more schema documents, which define common elements that are shared with other configuration files and elements that are specific to the enclosing configuration file,
    the configuration file contains a top-level root element which in turn contains one or more sub-elements,
    each of the sub-elements contains a set of configuration data for the event processor,
    each stream functions as a virtual channel connecting one or more event sources, event sinks and event processors, and
    each event processor executes its user-defined processing rules against one or more streams;
  providing a plurality of adapters, each of which provides an interface that enables incoming data to be received at the event server and converted into event types that the event driven application understands;
  wherein the EPN as defined by its assembly file further includes that at least two of the event processors should operate concurrently to operate on one or more input streams; and
  wherein upon receiving the incoming data from the one or more input streams via the event sources, the event server controls the flow of events so that the events are processed concurrently, including duplicating events as appropriate for concurrent processing by each event processor.

* * * * *

UNITED STATES PATENT AND TRADEMARK OFFICE
CERTIFICATE OF CORRECTION

PATENT NO.       : 8,543,534 B2                                                        Page 1 of 1
APPLICATION NO.  : 12/133167
DATED            : September 24, 2013
INVENTOR(S)      : Alves et al.

It is certified that error appears in the above-identified patent and that said Letters Patent is hereby corrected as shown below:

On Title page 2, column 1, under Other Publications, line 11, delete "he" and insert -- the --, therefor.

In the Specification

In column 3, line 38, delete "archives" and insert -- archive. --, therefor.

In column 20, line 48, delete "(Core18)," and insert -- (Corel8), --, therefor.

In column 26, line 21, delete "itself," and insert -- itself; --, therefor.

In column 43, line 23, delete "onevent" and insert -- onEvent --, therefor.

In column 43, line 46, delete "onevent" and insert -- onEvent --, therefor.

In column 43, line 47, delete "onevent" and insert -- onEvent --, therefor.

Signed and Sealed this
Twenty-fifth Day of February, 2014

Michelle K. Lee
*Deputy Director of the United States Patent and Trademark Office*